(12) United States Patent
Huang

(10) Patent No.: US 10,114,802 B2
(45) Date of Patent: Oct. 30, 2018

(54) METHOD, DEVICE, AND SYSTEM FOR ACCESSING THIRD PARTY PLATFORMS VIA A MESSAGING APPLICATION

(71) Applicant: Tencent Technology (Shenzhen) Co. Ltd., Shenzhen, Guangdong (CN)

(72) Inventor: Tianqing Huang, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 122 days.

(21) Appl. No.: 13/990,792

(22) PCT Filed: Apr. 28, 2013

(86) PCT No.: PCT/CN2013/075012
§ 371 (c)(1),
(2) Date: Jul. 28, 2014

(87) PCT Pub. No.: WO2014/176748
PCT Pub. Date: Nov. 6, 2014

(65) Prior Publication Data
US 2015/0143216 A1    May 21, 2015

(51) Int. Cl.
*G06F 17/22* (2006.01)
*H04L 12/58* (2006.01)
(Continued)

(52) U.S. Cl.
CPC ...... *G06F 17/2235* (2013.01); *G06F 3/04817* (2013.01); *H04L 51/04* (2013.01); *H04L 65/403* (2013.01)

(58) Field of Classification Search
CPC . G06F 17/2235; G06F 3/04817; H04L 51/04; H04L 65/403
(Continued)

(56) References Cited

U.S. PATENT DOCUMENTS

2002/0133604 A1*  9/2002  Khanna ............... G06F 21/6236
                                                    709/229
2004/0073616 A1*  4/2004  Fellenstein ......... G06Q 10/107
                                                    709/206
(Continued)

FOREIGN PATENT DOCUMENTS

CN    101834808    9/2010
CN    102238213    11/2011
(Continued)

OTHER PUBLICATIONS

International Search Report and Written Opinion dated Feb. 6, 2014, directed to International Application No. PCT/CN2013/075012; 8 pages.
(Continued)

*Primary Examiner* — Roland J Casillas
(74) *Attorney, Agent, or Firm* — Morgan, Lewis & Bockius LLP

(57) ABSTRACT

Provided herein are methods, devices, and systems for use in social networking and messaging applications. In particular, methods, devices, and systems for providing a user with access to a third party platform (e.g., a Public Number) in a messaging application are disclosed. Provided herein is a "My Apps" feature providing a stable and intuitive point of entry for a user to view, access, and manage Public Numbers. Also provided herein is a "Connector" feature that facilitates forwarding and saving information in a Public Number for processing. Additionally provided herein is a "Historic Messages" feature allowing a user to view a Public Number's historic messages without following the Public Number.

19 Claims, 14 Drawing Sheets

(51) Int. Cl.
*G06F 3/0481* (2013.01)
*H04L 29/06* (2006.01)

(58) Field of Classification Search
USPC .......................................................... 715/208
See application file for complete search history.

(56) References Cited

U.S. PATENT DOCUMENTS

| | | | |
|---|---|---|---|
| 2008/0040673 A1* | 2/2008 | Zuckerberg | G06F 17/30867 715/745 |
| 2012/0168493 A1* | 7/2012 | Worms | G06Q 10/00 235/375 |
| 2012/0181330 A1* | 7/2012 | Kim | G06Q 30/02 235/375 |
| 2013/0086699 A1 | 4/2013 | Polis et al. | |
| 2013/0097279 A1* | 4/2013 | Polis | H04L 67/00 709/217 |

FOREIGN PATENT DOCUMENTS

| | | |
|---|---|---|
| CN | 102694751 | 9/2012 |
| CN | 102821084 | 12/2012 |
| CN | 102833695 | 12/2012 |
| CN | 102857885 | 1/2013 |

OTHER PUBLICATIONS

First Office Action dated Oct. 12, 2015, directed to CN Application No. 201310156449.2; with concise explanation of relevance; 6 pages.
Tencent Technology, IPRP, PCT/CN2013/075012, Nov. 3, 2015, 6 pgs.

\* cited by examiner

METHOD, DEVICE, AND SYSTEM FOR ACCESSING THIRD PARTY PLATFORMS VIA A MESSAGING APPLICATION

CROSS-REFERENCE TO RELATED APPLICATIONS

This application is a National Phase application under 35 U.S.C. § 371 of International Application No. PCT/CN2013/075012 filed Apr. 28, 2013. The content of the above application is herein incorporated by reference in its entirety for all intended purposes.

TECHNICAL FIELD

The present disclosure relates generally to social networking and messaging applications, and more particularly, to providing access to third party platforms via a messaging application.

BACKGROUND

People are social creatures. By working together, a group of people create value that is greater than the sum of the individuals within the group. The concept of social networking has been around, and has recently been adapted to the Internet (the World Wide Web). New Web applications offer an ever increasing number of functionalities to Internet users, and are changing Internet social networking from top-down to bottom-up creation of information and interaction. Nowadays, individual users create content that everyone can share, while in the past there were only a few large media corporations creating content on the Internet for the users to access. The prevalence and popularity of online social networks have transformed the Internet; it is becoming another dimension of the society, where people connect, interact, follow up and continue to build relationships.

Chat system technology, commonly referred to as online chat, allows users to communicate in near-real time over a network, such as the Internet or an intranet. The most common forms of online chat are direct, one-to-one chat, commonly referred to as instant messaging (or "IM"). Advances in mobile communication technologies, for example, in smart phones and other portable computing devices, have made it possible for users to communicate from virtually anywhere around the world.

Social networks and instant messaging platforms have also become a competitive market where a customer and a merchant or service provider do business, for example, as an online buyer and an online seller, respectively. Due to the high mobility of both the online buyer and seller populations, however, there is a need to provide one or both parties with a stable and intuitive interface for facilitating interactions and transactions. There is also a need for additional and enhanced capabilities of processing information communicated among multiple users including online buyers and sellers.

SUMMARY

In one aspect, disclosed herein is a method for providing a first client with access to information of a second client managed by a server system, the method comprising: at the server system having one or more processors and memory for storing programs to be executed by the one or more processors, receiving an information access request from the first client on a client terminal; in response to the information access request, generating an icon or the like linked to the requested information of the second client; and forwarding the icon or the like to the first client, wherein the icon or the like is to be arranged on a display of the client terminal, wherein the icon or the like comprises information identifying the second client.

In another aspect, disclosed herein is a method for providing a first client with access to information of a second client managed by a server system, the method comprising: the first client sending an information access request from a client terminal to the server system; receiving at the client terminal an icon linked to the requested information of the second client, wherein the icon is generated at the server system in response to the information access request; and arranging the icon on a display of the client terminal, wherein the icon comprises information identifying the second client.

In another aspect, provided herein is a server system, comprising: one or more processors; memory; and one or more programs stored in the memory for providing a first client with access to information of a second client managed by the server system, wherein the one or more programs, when executed by the one or more processors, cause the server system to: receive an information access request from the first client on a client terminal; in response to the information access request, generate an icon or the like linked to the requested information of the second client; and forward the icon or the like to the first client, wherein the icon or the like is to be arranged on a display of the client terminal, wherein the icon or the like comprises information identifying the second client.

In one embodiment, the icon or the like can be positioned within a matrix on the display. In any of the preceding embodiments, the server system can control the arrangement of the icon or the like on the display. In any of the preceding embodiments, the server system can control the setting of the Public Number or application, and/or the verification of the Public Number or application. In any of the preceding embodiments, the Public Number or application can be associated with the first client's account managed by the server system. In any of the preceding embodiments, the Public Number or application can be synchronized between the server system and the client terminal.

In one aspect, provided herein is a method for forwarding information on a client terminal from a first client of a server system, the method comprising: at the server system having one or more processors and memory for storing programs to be executed by the one or more processors, receiving an instruction from the first client to forward information to a second client of the server system; forwarding the information to the second client in accordance with a data exchange protocol between the first client and the second client; receiving a feedback about the forwarded information from the second client; and forwarding the feedback to the first client, wherein the feedback is to be displayed on a display of the client terminal.

In another aspect, a method for forwarding information on a client terminal from a first client of a server system is provided, the method comprising: at the server system having one or more processors and memory for storing programs to be executed by the one or more processors, receiving a request from the first client to forward information on the client terminal; in response to the request, generating a link to a second client and returning the link to the first client, wherein the link is to be displayed on a display of the client terminal; receiving an instruction from the first client via the link to forward information to the second client; forwarding the information to the second client in accordance with a data exchange protocol between the first client and the second client; receiving a feedback about the forwarded information from the second client; and forwarding the feedback to the first client, wherein the feedback is to be displayed on a display of the client terminal.

In another aspect, provided herein is a method for forwarding information on a client terminal from a first client of a server system, the method comprising: the first client sending a request to the server system to forward information on the client terminal; receiving a link to a second client, wherein the link is generated at the server system in response to the request, wherein the link is to be displayed on a display of the client terminal; sending an instruction to the server system via the link to forward information to the second client; receiving a feedback about the forwarded information from the second client, wherein the feedback is to be displayed on a display of the client terminal.

In yet another aspect, disclosed herein is a server system, comprising: one or more processors; memory; and one or more programs stored in the memory for forwarding information on a client terminal from a first client of a server system, wherein the one or more programs, when executed by the one or more processors, cause the server system to: receive an instruction from the first client to forward information to a second client of the server system; forward the information to the second client in accordance with a data exchange protocol between the first client and the second client; receive a feedback about the forwarded information from the second client; and forward the feedback to the first client, wherein the feedback is to be displayed on a display of the client terminal.

In any of the preceding embodiments, the feedback can confirm processing of the forwarded information. In any of the preceding embodiments, processing of the information can comprise saving the information in the Public Number or application.

Also disclosed herein is a method for providing a first client with a second client's historic activity managed by a server system, the method comprising: at the server system having one or more processors and memory for storing programs to be executed by the one or more processors, receiving a request from the first client for the second client's historic activity; and in response to the request, generating an output of the requested historic activity, wherein the output is to be displayed on a display of a client terminal to the first client, wherein a data exchange protocol between the first client and the second client has not been established in the server system.

Also disclosed herein is a method for providing a first client with a second client's historic activity managed by a server system, the method comprising: the first client sending a request to the server system for the second client's historic activity; and receiving an output of the requested historic activity generated at the server system in response to the request, wherein the output is to be displayed on a display of a client terminal to the first client, wherein a data exchange protocol between the first client and the second client has not been established in the server system.

In another aspect, a server system is provided herein, the server system comprising: one or more processors; memory; and one or more programs stored in the memory for providing a first client with a second client's historic activity managed by a server system, wherein the one or more programs, when executed by the one or more processors, cause the server system to: receive a request from the first client for the second client's historic activity; and in response to the request, generate an output of the requested historic activity, wherein the output is to be displayed on a display of a client terminal to the first client, wherein a data exchange protocol between the first client and the second client has not been established in the server system.

In any of the foregoing embodiments, the historic activity can be a historic message. In any of the foregoing embodiments, the server system can control how the output of the requested historic activity is displayed. In any of the foregoing embodiments, the Public Number or application can be synchronized between the server system and the client terminal.

In any of the preceding embodiments, the second client can be a Public Number or an application. In any of the preceding embodiments, the server system can be an instant messaging server system. In any of the preceding embodiments, the client terminal can be a phone, a smart phone, a computer, a tablet, a pad, a PDA, a mobile device, or any combination thereof.

DETAILED DESCRIPTION

Figure 1:
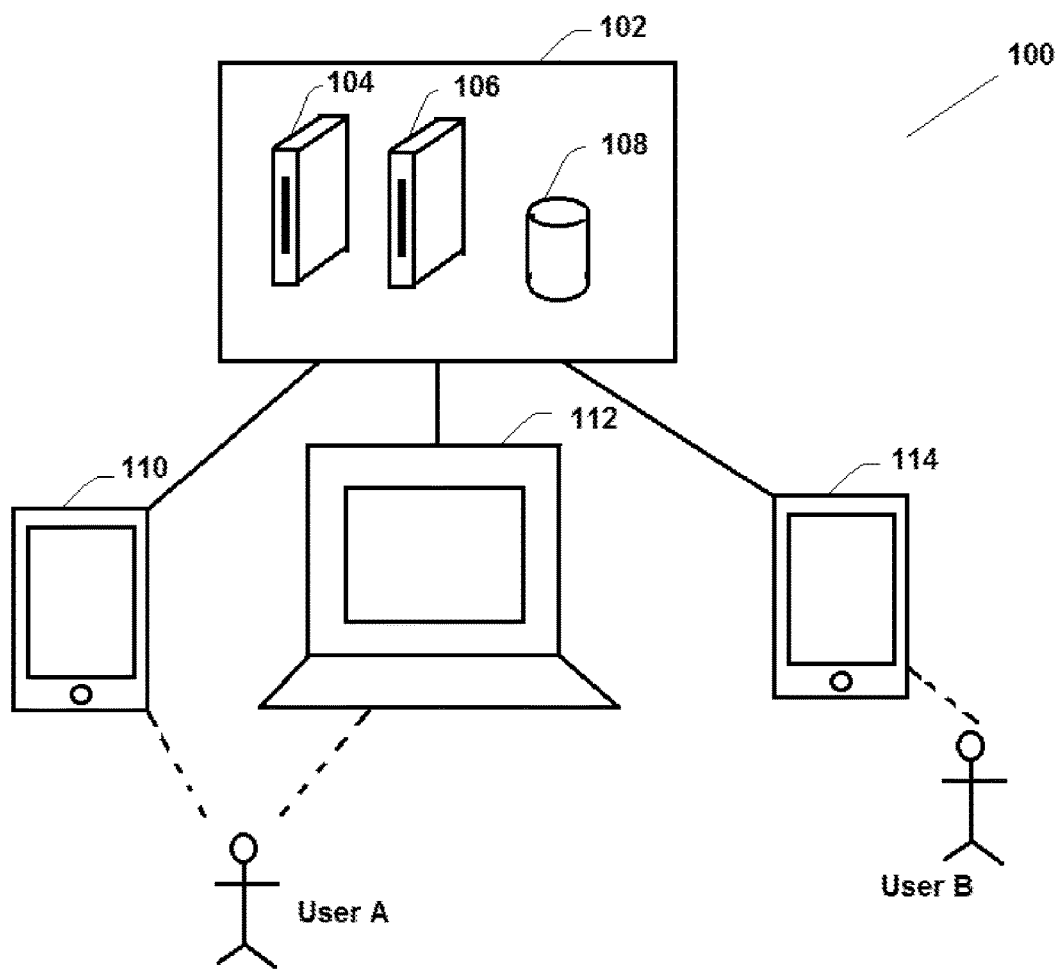
FIG. 1 is a block diagram illustrating exemplary structure of a social network system, according to an embodiment of the disclosure.

A detailed description of one or more embodiments of the claimed subject matter is provided below along with accompanying figures that illustrate the principles of the claimed subject matter. The claimed subject matter is described in connection with such embodiments, but the claimed subject matter is not limited to any embodiment. It is to be understood that the claimed subject matter may be embodied in various forms, and that the claimed subject matter encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure or manner. Numerous specific details are set forth in the following description in order to provide a thorough understanding of the present disclosure. These details are provided for the purpose of example and the claimed subject matter may be practiced according to the claims without some or all of these specific details. For the purpose of clarity, technical material that is known in the technical fields related to the claimed subject matter has not been described in detail so that the claimed subject matter is not unnecessarily obscured.

The claimed subject matter can be implemented in numerous ways, including as a technique, a system, a process, an apparatus, a computer program embodied on a non-transitory computer readable storage medium, a server, a processor, such as a processor configured to execute instructions stored on and/or provided by a non-transitory memory coupled to the processor, and any combinations thereof. When steps of a method or process of the claimed subject matter are disclosed, the order of the steps to perform the method or process may be altered within the scope of the claimed subject matter unless stated otherwise. Unless otherwise specified, a component of the claimed subject matter (e.g., a Public Number, a "My Apps" interface, a Connector, a "Historic Messages" interface, a webpage, a processor, or a device) described as being configured to perform a task may be implemented as a general component that can be temporarily configured to perform the task at a given time, or as a specific component that can be manufactured or designed to perform the task. A processor or server may be one or more devices, circuits, and/or processing cores configured to process data, including computer programs, text, numeric, image, video, audio, and other types of multimedia data.

The present disclosure relates generally to social networking and messaging applications, and more particularly, to method, device, and system for using a personal, business, or group account (e.g., a Public Number) associated with a communication application (e.g., a messaging application) for providing user services. Social networking services can include, but are not limited to, services and/or features provided by or associated with, for example, Weixin (or WeChat), Google+, Facebook, Twitter, LinkedIn, Pinterest, tumblr, blogspot, Wordpress, and/or Myspace. Service listing and/or evaluation websites such as Angie's List and Yelp may also be considered social networks that allow users to connect and interact with each other. For example, Weixin (or WeChat) is a mobile communication and social networking application, developed by Tencent Technology (Shenzhen, China). Unless otherwise specified, "Weixin" and "WeChat" can be used interchangeably.

FIG. 1 illustrates an exemplary configuration of a social network 100 connecting different users. As illustrated, the social network 100 can include a server for facilitating communications among the members of the social network. The server 100 can also host various services provided to some or all of the members of the network. The server 100 may include a cluster of servers 104, 106 and a database 108.

A member can use a user device 110, 112, 114 to access the social network and the services and/or applications provided thereon through the Internet or another network. As illustrated in FIG. 1, the same user A may access the social network using different user devices 110, 112 at different locations and/or at different times. Similarly, User B can access the network using his own device 114. User devices can be any electronic devices that are compatible with or can be made compatible with the present disclosure. Non-limiting examples of user devices include personal digital assistants (PDAs), mobile phones, smart phones, other types of smart devices such as smart TVs, in-car devices, e-readers, tablet PCs, desktop computers, and laptop computers. A user device, as referred to hereinafter, can include any or all devices suitable for performing the various operations disclosed in the embodiments below.

The server 102 and the services and applications provided thereon can be accessible to one or more types of user devices. For example, a communication application such as the WeChat application can be used on smartphones such as an iPhone, Android phone, Windows phone, Symbian (for example, Symbian Touch or Symbian Keyboard), a Blackberry, or as its corresponding web version (e.g., Web WeChat) on any desktop or laptop computers. In addition, the applications provided by the server 102 can be compatible with or made compatible with any operation systems, such as Android, BSD, iOS, Linux, Mac OS X, QNX, Microsoft Windows, Windows Phone, and IBM z/OS.

Social networks and applications can exist in various forms, including online communities where users interact and establish relationships with each other. Users of a social network can interact with each other in various ways including chatting, emailing, file sharing, blogging, and being members of or following one or more groups. Users of a social network may join or follow a group for any number of reasons.

Users of a social network can establish relationships with each other in various ways on the social network, including by joining common groups, becoming "friends," or making a "connection." In certain aspects, a user may log into a social network using an application on a user device to interact and establish relationships with other users. As referred to hereinafter, a user can be an individual user, enterprise user, organization, or any other types of entity. The user can typically be identified to the social network by a user identification, such as an account number, account name, username, and/or password, which may be required for logging into the social network from one or more of the user devices. In some cases, the user may log into one or more social networks at the same time. In some embodiments, users can log into a social network or their user device using a user identification and password. In some cases, the user can be anonymous in that the user identification is a user name, screen name, or nickname. In other cases, the user identification may be associated with more specific identifying information, such as the user's real name, identification card number, passport number, or social security number. In some embodiments, a user can be identified by different user names depending on which social network or user device he or she is accessing.

The terms "user" and "client" are used interchangeably unless otherwise specified. A user or client of a social networking service, a messaging application, and/or a server system disclosed herein can access, for example, the social networking service, messaging application, and/or server system on any suitable user device or client terminal. The terms "user device," "client terminal," "user terminal," and "client device" are used interchangeably unless otherwise specified.

I. Public Number

Public Number, as referred to herein, can refer to a personal, business, or group account associated with a social network application/platform for facilitating one or more services, operations, and/or communications/interactions to members of the social network. The application/platform supporting one or more Public Numbers can be referred to as Public Number app/platform, respectively. While Public Number is discussed in various embodiments of the disclosure below, it should be understood that other similar types of accounts, applications, and/or platforms can be employed in these embodiments without departing from the spirit of the disclosure. An example of Public Number platform is the WeChat Public Number platform by Tencent.

A Public Number can be assigned to, represent, correspond to, or be associated with an individual user of a social network. In some embodiment, the individual user has to be a public figure such as a celebrity or a government official to obtain his own Public Number. In other embodiments, the individual user has to have at least a certain number of followers to be assigned a Public Number. Different criteria can be applied in granting Public Numbers to individual users. Alternatively, any individual user having a basic social network account can be allowed to convert or upgrade his account to a Public Number. In other embodiments, a Public Number can be assigned to, represent, correspond to, or be associated with an entity, such as an enterprise, organization (e.g., for-profit or non-profit), business (such as a corporation, company, partnership), business association, government or government agency, team, franchise, brand, campaign, foundation, group, and/or a political party, that is associated with a social network.

A Public Number can allow its owner to communicate with a community of users on the social network for various purposes. For example, a Public Number can facilitate information exchange and/or dissemination. In particular, a Public Number can provide information that other users or Public Numbers may be interested in, including for example, weather forecast, traffic updates, fashion trends, home improvement advice, restaurant evaluations and recommendations, and travel information such as attractions, fight status, and hotels.

Additionally or alternatively, a Public Number can provide entertainment or service to one or more individual users or other Public Numbers. For example, a Public Number may provide translation services, from one or more languages to another. A bank or other type of financial institution may utilize a Public Number to provide on-line and/or mobile banking services or other type of financial services, for example, on-line stock trading and investing. As another example, a movie producer may publish information about its newest movies (e.g., title, genre, running time, cast, story line, behind-the-scene stories, and trailers) via its Public Number. Similarly, a movie critic may establish a Public Number to provide movie commentaries, reviews, and/or rating.

Additionally or alternatively, a Public Number can offer a merchandise or product for sale. For example, a Public Number may display to this followers and/or other members of the social network one or more products for sale. The products can be for example, books, music, movie tickets, toys, or any other goods that can be sold online. The Public Number can receive orders from users and collect payment information, just like any other online store front. In fact, a Public Number can be an alternative to conventional online stores. In some embodiments, a seller can sell products exclusively through his Public Number. In other embodiments, existing online sellers or offline sellers (i.e., sellers with conventional store front) can obtain their own Public Numbers to provide an additional channel for selling their goods.

Additionally or alternatively, a Public Number can both provide entertainment, service, or information, and offer merchandise or product for sale. For example, a Public Number assigned to a movie producer may provide a list of movies produced by him currently in theater and information about each movie, as well as tickets for exclusive screening of one or more the movies.

In fact, any type of services or products can be provided via a Public Number. A Public Number can be customized individually based on the product or service being offered through the Public Number. The customization can be based on the requirements of the entity offering the product or service. In one embodiment, a Public Number can be created and modified using available templates or designs.

Payments for purchasing a service or product via a Public Number can be made through available online payment mechanisms including those specifically designed to work with app and/or web-based programs such as WeChat. Additionally or alternatively, a Public Number may connect to a third party website or App to complete the payment transaction. Exemplary methods, terminals, and systems for making payment via a messaging application on a mobile device are described in detail in another application entitled "Method, Terminal, and System for Making Payment with a Messaging Application on a Mobile Device," the disclosure of which is incorporated herein in its entirety.

In yet another embodiment, a charitable organization or a non-profit organization may have a Public Number. Using its Public Number, the charitable or non-profit organization may solicit donations or contributions from the follows of the Public Numbers and/or other members of the social network. In some embodiments, the Public Number can allow the charitable or non-profit organization to accept and receive donations or contributions without solicitation.

Public Numbers may be provided in a social network or by a social networking service, including social networking websites, professional networking websites, business networking websites, service listing and/or evaluation websites, personal websites, blogs, and any other suitable Internet accessible database, domain, or subdomain, via which a user can connect to or communicate with other users. In some embodiments, a Public Number may be provided as a standalone app or embedded in another app designed for accessing a social network and/or using a social networking service. For example, a Public Number may be provided in a messaging or communication app such as WeChat.

A Public Number can be generated for an entity based on a request. In particular, generating a Public Number can include a verification step to verify, for example, the identity of the entity and other information provided by the entity. A Public Number can then be assigned to the entity. A user interface can be provided for the entity to customize the information and/or content being provided via its Public Number. Once the Public Number is established and made available online via, for example, a Web or app-based interface, the entity associated with the Public Number and other users/entities can have access to information, products, and services provided through the Public Number.

Online social networks are commonly based on shared interests, such as, professional, recreational, social, academic, political, geographic and cultural interests. A Public Number may be established for any group with a common interest. A user expanding into a new area of interest may not have experience in that new area, and therefore may not know whether to follow a Public Number or not (e.g., to download an app corresponding to the Public Number to access information provided by the Public Number). However, the user may have a friend who knows about this new area. Thus, it would be desirable to leverage the trust and knowledge of that friend to determine whether to follow a Public Number in the new area of interest.

If the user decides to follow the Public Number, he can learn and/or keep informed of one or more interests and/or topics. Additionally or alternatively, users can follow a Public Number to engage in discussions about a particular subject. Additionally or alternatively, users can follow a Public Number to express a relationship with other users. Indeed, users can follow a Public Number for any merchandise, product, service, entertainment, or any other information.

A Public Number can be identified or located by one or more users of a social network. For example, a Public Number can be identified by searching in an App, based on a friend's recommendation, or through a promotion by a social network service provider or the entity associated with the Public Number. A user may also become aware of a number associated with a Public Number elsewhere, for example, outside the realm of the Internet, such as from TV or printed material. In this case, a user may add or follow the Public Number in an App based on the information obtained from these sources.

A Public Number may have a profile (e.g., a Public Number profile). It is to be understood that a Public Number can also be viewed as a user with respect to the other users/Public Numbers associated with the same Public Number platform. In fact, as mentioned above, a Public Number can be associated with either an individual or an entity. A Public Number profile can include an ID, name, moniker, tag, and/or handle usable in identifying the user within the bounds of the social networking service. A suitable Public Number description can include any statements or lists that characterize, for example, the individual, entity, services, and/or products associated with the Public Number and can indicate the declared interests associated with the user. Suitable content for a Public Number can include any post, comment, blog, tweet, re-tweet, and/or hyperlink that further characterize the Public Number and can be indicative of the purpose and interests associated with the Public Number and/or the products and services provided by the Public Number. Connections associated with a Public Number can include a social graph representation of the connections with other users/Public Numbers in the social networking service. Connections can be of, for example, one or more of the following types: a follower, a following, a friend and self. As an example, Public Number A (or User A) can be a follower of Public Number B (or User B) if A chooses to subscribe to the content generated by B. Conversely, B can have a following that includes at least A. If users A and B are mutual followers and thus part of each other's following, A and B can be classified as friends. A Public Number can also connect to itself and its associated entity. The connections can indicate mutual interests among the connected Public Numbers or users.

A Public Number can be associated with any social media and social networking system accessible on a network by any device. In one embodiment, a user in the social media and social networking system may be enabled to have one, two, or multiple customized profiles. In another embodiment, a social media and social networking application such as WeChat may be configured to display full, partial, or customized profile information of a user based on the individual or groups viewing or visiting the user. The social networking system, for example, WeChat, may provide access to multiple users or groups based on match between profile data such as an email address, domain name, and an access control list. For example, multiple individual users may be associated with a Public Number, and they can be granted access based on match between their profile data and the Public Number profile. In another embodiment, WeChat or other social media and social networking system of the present disclosure may personalize websites and search result content based on a user's profile.

II. My App

A user device may display one or more Public Numbers as icons in the same way that any other apps can be displayed on the device. A user may add, remove, rearrange, and/or bookmark one or more Public Numbers. Depending on the screen dimension of the device, one or more of the icons representing Public Numbers can be displayed on the screen.

Figure 2A:
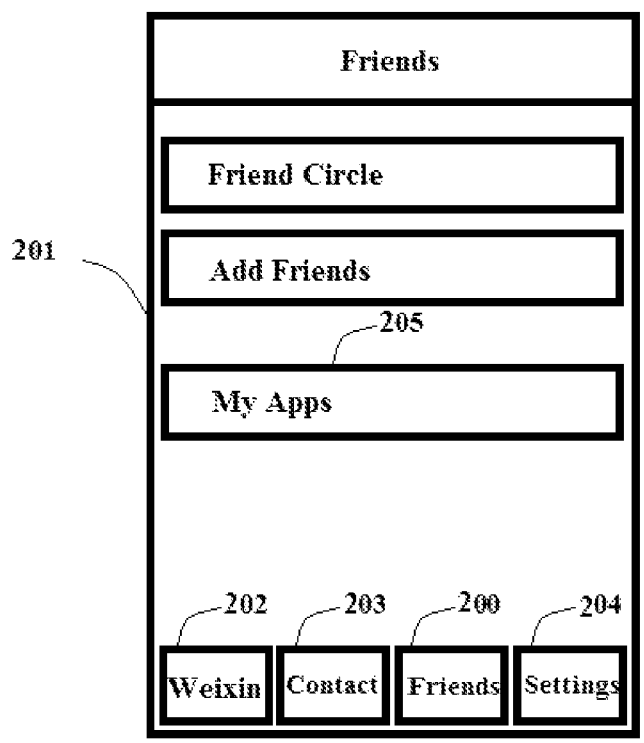
FIGS. 2A-2C are exemplary screen shots of "My Apps," according to an embodiment of the disclosure.

"My Apps," as referred to hereinafter is an interface for displaying Public Numbers on a device. Each App within "My Apps" can correspond to a Public Number. The interface can be a part of or accessed from the home screen of device. Additionally or alternatively, it can be a part of or accessed from an application (e.g., a communication app such as WeChat) on the device. In various embodiments, the interface can have one or more icons each corresponding to a Public Number. The interface can be accessed from any suitable screen, level, folder, tab, or the like within a social network website or App (e.g., WeChat) of the present disclosure. For example, as shown in FIG. 2A, "My Apps" can be accessed under a "Friends" interface. When a user clicks a "Friends" tab or the like 200 on any screen of the app, he or she can be directed to screen 201 showing the contents of the "Friends" interface from whichever interface he or she was using. The interfaces can include, for example, WeChat sessions (which can be accessed using the "Weixin" tab 202), "Contact" (which can be accessed using the "Contact" tab 203) or "Settings" (which can be accessed using the "Settings" tab 204). Screen 201 can reside on a display of any suitable user device. The "My Apps" tab or the like 205, along with other functionalities under "Friends" may be arranged in any order or manner. In some embodiments, the order of arrangement may be customized. For example, when the tabs are arranged in a vertical order from top to bottom of a screen, the "My Apps" tab may be moved up or down. In another example, when the tabs are arranged in a matrix of a plurality of tabs or icons, each corresponding to a functionality under "Friends," the "My Apps" tab or icon may be moved up or down, and/or left or right, to any position within the matrix. In certain embodiments where there is more than one page of tabs, the "My Apps" tab may be moved from one page to another. In certain embodiments, a user clicks on the tab to be moved and holds onto it, thereby "dragging" it to the desired position. In other embodiments, a "move to" button or the like can be provided to allow a user may specify the position where the tab is to be moved. In certain aspects, tabs or icons arranged in a matrix may provide a quicker and more intuitive way of navigating the various functionalities, compared to an arrangement in a vertical order from top to bottom of a screen.

After a user clicks on a "My Apps" tab, the user can be directed to a screen or a graphical user interface (GUI) for viewing one or more Public Numbers followed by the user. The Public Numbers may be arranged in any order or manner on the screen or the graphical user interface. In one embodiment, the Public Numbers may be arranged in a vertical order from top to bottom of a screen. In one embodiment, the initial and default order can be according to when a Public Number is added. For example, the most recently added Public Number can be placed after all the earlier added Public Numbers. Alternatively, the Public Number that a user has communicated with or visited most recently can be listed at the top. The less recent a user has communicated with or visited a Public Number, the lower down the screen the Public Number can be listed. Alternatively, the more recent a user has communicated with or visited a Public Number, the lower down the screen the Public Number can be listed. In this case, the most recent Public Number the user has interacted with or visited is listed at the bottom of a screen or page. In some embodiments, the Public Number a user most recently interacted with or visited can be displayed first, regardless of where in the list or matrix that Public Number is listed. In certain embodiments, the vertical list is alphabetically ordered, for example, by the alphabetical order of the names of a multiplicity of Public Numbers. In some embodiments, a user may specify the position or order one or more Public Numbers are to be listed. For example, a user may specify that Public Number A is to be kept at the top, Public Number B is to be kept at the bottom, Public Number C is to be kept third in the row, Public Number D is to be kept immediately before or after Public Number E, or Public Number F is to be kept x position(s) before or after Public Number G, wherein x can be any integral number a user specifies, or any combinations thereof.

A Public Number can be indicated or identified by any means within the vertical row of Public Numbers. For example, a Public Number can be differentiated from other Public Numbers by its name, nickname, title, link, screenshot of a scale, icon, picture, photo, design, historic message(s), or any combinations therefore, associated with the Public Number. In some embodiments, the most recent activity, such as a post, of a Public Number can be shown in the vertical list. In some embodiments, a Public Number's activity that is most relevant to a user can be shown in the vertical list. For example, a document a user has saved into a Public Number can be shown, while documents that other users have saved in the same Public Number may not shown. In certain embodiments, not all the content within a Public Number may be shown. In any of the embodiments disclosed herein, a user may change the order or manner of arranging the Public Numbers. For example, a Public Number may be moved up or down a vertical list on a "My Apps" screen.

In the above embodiments, a user may need to scroll up or down in order to locate, view, or access a particular Public Number. In some cases, it may take a long time to accomplish these tasks. This is particularly true for smart phones or other mobile devices that may have relatively small display screens. Provided in the embodiments below are other types of "My App" interfaces that can allow quicker and more intuitive ways of viewing a number of Public Numbers on the screen of a user device.

In one embodiment, the Public Numbers can be represented by icons displayed on a mobile device's screen in a matrix formation. This allows a user to be able to quickly locate a particular Public Number. The user can quickly navigate and view any Public Number in "My Apps" by moving a pointer to a particular icon in the matrix. The user can click on an icon in the matrix to view and access the associated Public Number.

Figure 2B:
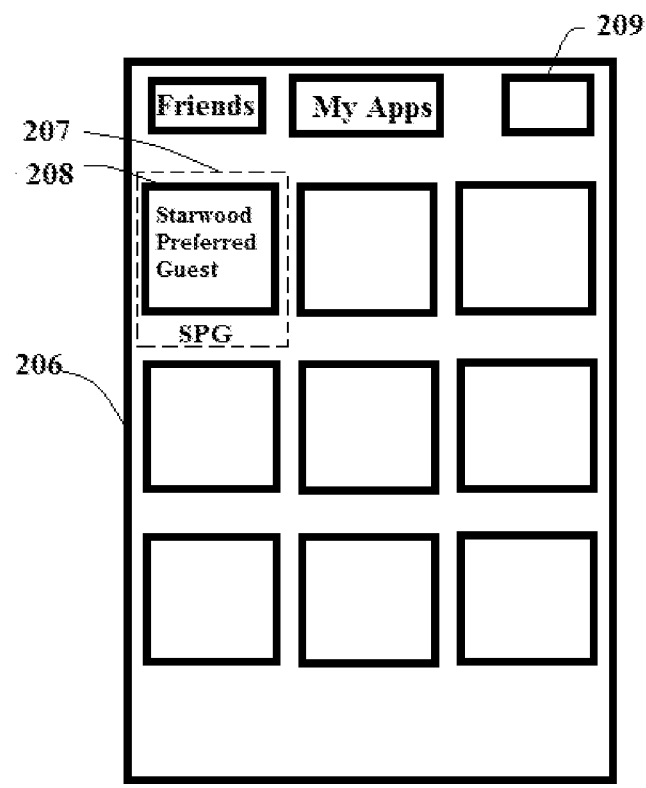

FIG. 2B illustrates an exemplary My App interface with the Public Number icons listed in a matrix layout. Screen 206 can be a screen on any user device. As illustrated, a typical App icon can include information about the Public Number it corresponds to. For example, such information can include, in a particular App 207, a picture or design (i.e., a cover or the like 208) with the embedded text "Starwood Preferred Guest" in the cover and a title line "SPG," that can also provide information about the Public Number. In certain embodiments, an icon for a Public Number may include a photo, a picture or a portrait of one or more people, for example, a WeChat user associated with the Public Number.

In some embodiments, when Public Numbers are arranged in a matrix of a plurality of icons, as shown in FIG. 2B, the Public Numbers may be moved up or down, and/or left or right, to any position within the matrix. In certain embodiments where there is more than one page or screen of icons, a Public Number may be moved from one page to another. In certain embodiments, a user can click on the icon to be moved and hold onto it, thereby "dragging" it to the desired position. In other embodiments, a "move to" button or the like can be provided by which a user may specify the position where the Public Number is to be moved.

In some embodiments, App icon, as well as the title line, can be personalized by a user. Such personalization may be done for the user's convenience, for example, to allow the icon for a Public Number to be quickly identified. In another aspect, such personalization may be done to conceal something which may be private, confidential or embarrassing to the user, in cases where the user device or WebChat is accessible or visible to another person, with or without the user's permission. By clicking an icon for a Public Number, the user can be directed to the same Public Number, no matter how the icon is personalized.

Customization or personalization of an App icon can be implemented in multiple ways. For example, a user can select which App he or she wants to customize by pressing a "Customize" button or the like. In one embodiment, there is provided a "Customize" button or the like, after an icon is selected. In one aspect, a "Customize" button or the like can be provided when a user clicks an icon to be customized and holds the icon for an extended period of time. In another aspect, the icon or the title line of a Public Number can become editable after the icon is selected. In one embodiment, an App icon can be customized with a new cover by pressing a "New Cover" button or the like which opens a drop-down menu to allow the user to choose a photo, a picture, or a design from a file or other browsing operation or to take a photo. Likewise, a "New Title" button or the like can be provided and, when pressed, can bring up a keyboard screen to allow the App title line to be revised and customized. In other embodiments, the icon or the title line of a Public Number can be edited after the icon is selected for customization, without having to provide a "New Cover" button or the like or a "New Name" button or the like. In one embodiment, pressing the cover to be replaced can allow a user to choose a photo, a picture, or a design from a file or other browsing operation or to take a photo. In another embodiment, pressing the title line to be edited can allow the user to enter a title line that overrides the previous title line.

In some embodiments, there can be a multiplicity of Public Number icons on a page. In one embodiment, there can be at least one Public Number icon on a page. In other embodiments, there can be at least N number of Public Number icons, where N is a number preconfigured in the OS of the mobile device, or predetermined by the application developer or the service provider. In embodiments where there can be multiple pages of Public Number icons, the total number of Public Numbers a user follows can be distributed and redistributed among the multiple pages in any combination. For example, such distribution or redistribution can be achieved by adding new Public Number icons in "My Apps," deleting existing Public Number icons from "My Apps," and/or moving Public Number icons from one page to another, or any combinations of the actions disclosed herein. In one embodiment, the upper limit for the number of Public Numbers in the "My Apps" feature can be 150. In this case, any Apps or Public Numbers that are added after a user has reached the limit cannot be displayed under "My Apps." However, those Apps can be displayed after deletion of one or more Apps from "My Apps."

In certain embodiments, Public Number icons can be organized in folders or the like. Similar to the Public Number icons, a folder may include information about the folder, and/or subfolders and/or Public Number icons within the folder. Such information can include a picture or design of a scale (i.e., a cover), optionally with suitable embedded text, and a title line. In one embodiment, the title line can provide revealing information about the Public Numbers in the folder. For example, Public Numbers providing translational services may be grouped and placed in a folder with a title line indicating the folder is for translational service providers. In one embodiment, the cover of a folder may include covers of all or some of the Public Numbers contained in the folder. In one aspect, covers of all or some of the Public Numbers contained in a folder can be miniaturized to a scale to fit the Public Number covers on the cover of the folder. In certain embodiments, the cover of a folder containing Public Number icons may comprise a photo, a picture or a portrait. As with the personalization of Public Number covers and title lines, personalization of the cover and/or title line of a folder or subfolder can be implemented in similar ways as disclosed.

It is to be understood that Public Number icons and folders containing the same can be arranged in any configuration that is compatible with the present disclosure. For example, the Public Numbers and folders on a WeChat "My Apps" screen can fit within the screen for fast and convenient identification of a Public Number or folder. In some embodiments, the Public Number icons and folders can be arranged in an X×Y matrix, where X and Y are numbers preconfigured in the OS of the mobile device, or predetermined by the application developer or the service provider. It is to be understood that any suitable matrix can be used. There is provided a method of customizing the dimension of a matrix for arranging Public Number icons and folders. In one embodiment, such a method is provided with "My Apps," under the "App Settings" tab or the like 214 shown in FIG. 2C. In one embodiment, the Public Number icons or folders can be arranged in a 3×4 matrix. In one embodiment, there can be 9 Public Number icons or folders on a page, arranged in a 3×3 matrix, for example, as shown in FIG. 2B. In cases where there can be multiple pages of Public Number icons or folders, one page may include Public Number icons or folders arranged in a different configuration from another page. For example, one page may include Public Number icons or folders arranged in a 3×4 matrix, while another page may include Public Number icons or folders arranged in a 4×4 matrix.

In any of the embodiments disclosed herein, the order and manner (for example, in a list or in a matrix) of Public Number arrangement in "My Apps" can be synchronized with a user's social network account such as a WeChat or Weixin account. In one embodiment, the synchronization can be implemented by a server, for example, the server 102 shown in FIG. 1. For example, the server 102 can track the number and identify of the Public Number followed by a particular user. This is because the same server can host the Public Number platform that creates and maintains various Public Numbers and other users of the social network. The information relating the number and identities of the Public Number associated with each user can be stored in the database 108. Depending on the number of the Public Numbers associated with the user, the server 102 can determine an arrangement of the Public Number icons to be displayed on the user device 110, 112, 114. For example, the server can determine, based on the number of Public Numbers, a dimension of the matrix of icons to be displayed on, for example, the My Apps interface. The number of icons to be displayed can also determine whether the icons are to be displayed in a matrix or another layout. The server 102 can also track the ranking of each Public Number with respect to the user based on, for example, how often the user accesses the particular Public Number. The ranking can be used to determine the location of the icon for each of the Public Number on the screen of the user device. In some embodiments, the server 102 can collect information regarding the user devices 110, 112, 114 including, for example, their types and models. Based on such information, the server can determine the screen size of each device. For example, an iPhone would have less screen space than a tablet PC. This information allows the server to further customize the My Apps layout to ensure that the Public Number icons can be quickly browsed through by the user. For example, the server 102 may present one layout (e.g., a 6×4 matrix) for My Apps if it determines that the user is accessing Public Numbers using his iPhone 110. When the user tries to access Public Numbers using his laptop 112, the server 102 can instead create a 10×6 matrix layout to display more information on the bigger screen of the laptop 112. In some embodiments, when the user makes changes to the layout of the Public Number icons in My Apps, the modified layout can be transmitted to the server. The server may track these changes and use this information when generating a My App interface for the user in the future. In some embodiments, the server 102 can, in fact, control other aspects of the implementation of My Apps.

In certain embodiments, when a user clicks an icon for a Public Number or a folder, the user can be prompted to enter a password in order to access the Public Number or folder. This provides an additional level of security when needed, for example, when a user purchases products or services from a Public Number and has his or her bank card or account associated with the Public Number. There can be provided a location for entering a password and a keyboard for such entry. For example, a keyboard can be located at the lower portion of the screen. In order to open an encrypted Public Number or folder, an entry in the password location should preferably match the user's predetermined password. Once a password is entered, a "Done" button or the like can be provided on the screen, which a user can press in order to compare the entered password with the predetermined password in order to access the encrypted Public Number. In certain embodiments, a "Return" button or the like can be provided to return to the WeChat "My Apps" screen.

In certain embodiments, a user may conduct a search for Public Numbers, and add one or more Public Numbers from the search results into the group of Public Numbers he or she follows. In one embodiment, one or more Public Numbers from the search results can be added into "My Apps." In one aspect, the search function can be provided in "My Apps." For example, there is provided a button or the like 209 (shown in FIG. 2B) which can allow a user to access a "Search and Add Apps" tool. If a user decides not to perform the search, he or she may click a "Cancel" button or the like 212 to return to a list or screen with the Public Numbers currently being followed. In one embodiment, when a user clicks the "Search and Add Apps" tab or the like 213, a graphical user interface is provided. In certain embodiments, the graphical user interface includes an input portion and a "Search" command or the like. A query including one or more search terms may be received via the input portion of the graphical user interface. In one embodiment, a user can click the input portion and bring up a keyboard screen to enter one or more search terms. In another embodiment, the entry of one or more search terms can be implemented by a user speaking the one or more search terms, and subsequence voice recognition and search term entry. In one aspect, the voice recognition and processing function can be provided by an app. In another aspect, the voice recognition function can be provided by the user's device. The user may choose any search term or any combination of search terms, in order to search for a Public Number. The search term may comprise part or all of a Public Number's name or nickname. Without being bound by any theory, the search term may also comprise part or all of other information relating to the Public Number including, for example, a mobile phone number or an email address.

In one embodiment, a query can identify one Public Number, and in a preferred embodiment, the Public Number is what a user is looking for. In other embodiments, more than one Public Numbers can be identified using a search term or search term combination. In one aspect, search results associated with the query can be provided and sorted by best matches. A user selection may be received, where the user selection selects at least a portion of the search results. In one aspect, a user selection can direct the user to the Public Number's profile. In one embodiment, a Public Number's profile can be a detailed profile, for example, one including the Public Number's name, nickname, Weixin number, profile picture or photo, profile from Sina Weibo, a tab or the like linked to the Public Number's historic messages, a "Follow" tab or the like that allows a user to follow the Public Number, or any combination thereof. In cases where a Public Number in the search results is already being followed by the user, additional information or functionalities in the Public Number's profile may be available to the user. For instance, the user may choose whether to receive messages from the Public Number, whether to show in the user's profile that the Public Number is being followed by the user, or whether to discontinue following a Public Number. In any of the embodiments described herein, there can be provided a "Clear Historic Messages" button or the like in the profile of a Public Number.

In certain embodiments, advanced search for Public Numbers can be provided in WeChat. For example, a query may combine search terms in different fields, including a Public Number's name or nickname, Weixin number (or WeChat number), QQ number, mobile phone number associated or bundled with a Weixin, WeChat, or QQ number, Facebook account associated or bundled with WeChat, or e-mail address associated or bundled with WeChat. Search terms in a multiple-term search query may be combined with an "AND" or an "OR" connector, in an order and combination of a user's choice to maximize the odds of retrieving results of best match. In certain embodiment, wild cards may be used in one or more search terms. In a further embodiment, a fuzzy search for Public Numbers is supported in WeChat. In one aspect, a fuzzy search can locate Apps that are likely to be relevant to a search parameter or term even when the parameter or term does not exactly correspond to the desired information. In a further embodiment, a switch between traditional Chinese and simplified Chinese searches is provided in WeChat.

In certain aspects, a code or an encoded image for a Public Number can be available. For example, the code may be a common 1D barcode. The encoded image can be a graphical pattern such as a barcode that can be scanned into a mobile device by an image recognition technique. The image recognition of the graphical pattern may be performed using a video camera on the mobile device and software installed thereon. In other embodiments, more sophisticated graphical patterns, such as 2D barcodes (e.g., QR codes, Microsoft tags) and other digitally decodable images may be used.

Figure 2C:
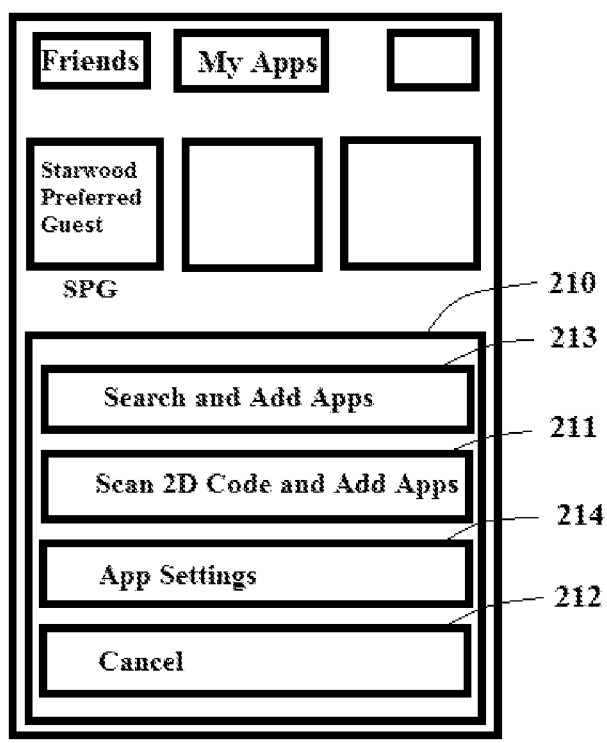

In certain embodiments, a 2D code or quick response (QR) code for a Public Number can be available. The 2D code or QR code may be presented to the user on a device with a display screen, such as a smart phone, a computer screen, or a TV screen (which may not may not be connected to the Internet), or on a printed material, such as a newspaper, a magazine, or a promotional flyer or coupon. In some embodiments, the device or printed material may be in physical control by a user. In certain embodiments, a user device is a mobile device which can be a smart phone with a video camera, or a non-phone mobile device, such as a tablet and an iPod with a video camera. In this case, a user may simply scan the 2D code or QR code, thereby following the Public Number associated with the code. In one embodiment, the Public Number associated with the code is added to the user's "My Apps". In one aspect, the functionality of adding a Public Number by scanning a 2D or QR code is provided in "My Apps" of WeChat, for example, via a tab or the like 209 (shown in FIG. 2B) providing a "Scan 2D Code to Add Apps" tool as shown in FIG. 2C. In one embodiment, when a user clicks a tab or the like 209, a pop-up screen 210 is displayed. Screen 210 can reside on a display of any suitable user device or client terminal, and in preferred embodiments, on a display of any suitable mobile device. When a user clicks a "Scan 2D Code to Add Apps" tab or the like 211 on screen 210, a video camera or the like is activated, and a window or the like is provided to allow a user to scan a 2D or QR code. After a code is scanned, the encode image may be directly processes by a user device or WeChat. Alternatively, there is provided an "Accept Image" or "Done" button or the like, which a user can press before the encode image is processed. If the scanned image is not satisfactory, there is provided a "Rescan" button or the like which allows a user to scan the 2D or QR code again. In one embodiment, there is provided a "Return" button or the like for a user to return to the "My Apps" interface. In one embodiment, a user device or WeChat recognizes the code and decodes the identifying information of the corresponding Public Number. In one aspect, a query within a Public Number database using the identifying information may be performed. Next, the corresponding Public Number is displayed, which a user may select to view the Public Number's profile, for example, a detailed profile as disclosed herein.

In other embodiments, a user may follow Public Numbers that one or more of his or her friends are following. In preferred embodiments, a user views the profile of a friend, which profile comprises information about the Public Numbers the friend followed or is following. In one embodiment, a first WeChat user views the detailed profile of a second WeChat user, which profile comprises information about the Public Numbers the second WeChat user followed or is following. In certain aspects, the second WeChat user is a WeChat friend of the first user, the first WeChat user is a WeChat friend of the second user, and/or the two users can be mutual friends in WeChat. After viewing a list of Public Numbers a WeChat friend is following, a user can view the profiles of the Public Numbers and decide whether to follow one or more of them. In one embodiment, a user clicks a Public Number shown as being followed by a friend on the friend's WeChat profile, and is directed to the Public Number's profile. In one embodiment, a Public Number's profile is a detailed profile, which may include the Public Number's name, nickname, Weixin number, profile picture or photo, profile from Sina Weibo, a tab or the like linked to the Public Number's historic messages, a "Follow" tab or the like that allows a user to follow the Public Number, or any combination thereof. In one embodiment, a user clicks a "Follow" tab or the like to follow the Public Number. In cases where a Public Number is already being followed by the user, additional information in the Public Number's profile or functionalities may be available to the user, as disclosed herein. For instance, the user may choose whether to receive messages from the Public Number, or whether to show in the user's profile that the Public Number is being followed by the user, or whether to discontinue following the Public Number. Information of a Public Number may be communicated to a user by other means, for example, through online chatting or real word conversation with friends, who may or may not be WeChat friends with the user, such that a user would want to follow the Public Number. In certain cases, a user may then search for the Public Number and add it to the user's "My Apps" according to the present disclosures.

A user may also search among the Public Numbers he or she is following. In certain embodiments, a user may have many Public Number icons in "My Apps" and a query within the Public Number is faster in locating a particular Public Number than browsing the icons one by one or page by page. This is particularly true when there can be folders or subfolders for Public Numbers. In one embodiment, there is provided a tab "Search within My Apps" or the like. In one embodiment, when a user clicks the "Search within My Apps" tab or the like, a graphical user interface is provided. In certain embodiments, the graphical user interface includes an input portion and a "Search" command or the like. A query including one or more search terms may be received via the input portion of the graphical user interface. In one embodiment, a user clicks the input portion and brings up a keyboard screen to enter one or more search terms. In another embodiment, the entry of one or more search terms is implemented by a user speaking the one or more search terms, and subsequence voice recognition and search term entry. In one aspect, the voice recognition function is provided by WeChat. In another aspect, the voice recognition function is provided by the user's device. In yet another aspect, WeChat enhances or improves the voice recognition function provided by the user device. The user may choose any search term or any combination of search terms, in order to search for a Public Number. The search term may comprise part or all of a Public Number's name or nickname. Without being bound by any theory, the search term may also comprise part or all of a Public Number's Weixin number (or WeChat number), QQ number, mobile phone number associated or bundled with a Weixin, WeChat, or QQ number, Facebook account associated or bundled with WeChat, or e-mail address associated or bundled with WeChat.

In certain cases, a Public Number may be added when a user device is "off-line," for example, when the device is not connected to the Internet, does not have wireless communication, or has restricted internet connection or wireless communication. In certain embodiments, a user device or WeChat on a user device may work in the "off-line" or "In Flight" mode or the like. Under these circumstances, when a user conducts a Public Number search, scans a 2D or QR code, or adds or follows a Public Number, the search, scanned code, added Public Number, or other information may be stored in WeChat on a user device, and be re-activated for subsequent steps and full functionality when the user is online, for example, when the user device is connected to the Internet or has wireless communication or both.

Among other devices, any mobile device that has wireless Internet connection may be used for the purpose of the present disclosure. In a preferred embodiment, a mobile phone is used. The mobile phone may use a variety of wireless communication technologies such as cellular networks 3G, 4G, EDGE, GPRS or CDMA to complete the steps disclosed herein. Other mobile electronic devices, such as iPod touch, wireless Internet-enabled tablets and PDA, may also have sufficient capabilities for wireless communication in accordance with the present disclosure.

It is to be understood that when a user follows a Public Number, the Public Number does not necessarily become a friend of the user. In one aspect, a WeChat user adds a Public Number in his or her "My Apps," but does not add the same Public Number as a WebChat friend. In this case, the Public Number is not shown in the user's "Friend Circle" tab or the like. In preferred embodiments, there can be provided separate tabs or the like for a user's "Friend Circle" and "My Apps". In certain embodiments, the WeChat user may or may not be a WeChat friend of the Public Number that is being followed by the user.

In preferred embodiments, a user can set or change the settings for "My Apps" and/or the Public Number he or she is following. In one aspect, there is provided a tab "App Settings" or the like 214 in WeChat (shown in FIG. 2C). When a user clicks an "App Settings" tab, he or she can choose whether or not to receive messages from one or more Public Numbers. In a further embodiment, a user may specify how to receive messages from one or more Public Numbers. For example, a user can set the frequency, number, content, format, or length of messages, decide how he or she is to be alerted (for example, by a pop-up screen, a sound, vibration of the device, an alert or a message sent to an e-mail address, or any combination thereof), or set a customized protocol of processing the messages upon receipt. A customized protocol may be: 1) ignoring the messages for a certain period of time; 2) reminding the user in a certain period of time at a certain frequency; 3) automatically forwarding messages to an e-mail address, or to one or more WeChat friends, or any combination thereof.

In another aspect, there is provided a tab "Show in My Profile" or the like in WeChat. A user can click a "Show in My Profile" tab or the like to choose whether or not to show one or more Public Numbers in the user's WeChat profile. In certain embodiments, such choice is implemented by the user checking or otherwise choosing the Public Number to be shown, or by switching a "Yes/No" switch or the like to "Yes" to show the Public Number. In a further embodiment, a user may specify how one or more Public Numbers are shown in his or her WeChat profile. For example, a user can set the order of the Public Numbers to be shown, how long each Public Number is to be shown, and the icon, title line or description of each Public Number to be shown. In other cases, a user can decide who sees the Public Numbers he or she is following. For example, a subset of WeChat users or a subset of the user's WeChat friends may be able to see the Public Numbers being followed, while others cannot see such Public Numbers. In one embodiment, a user authorizes a subset of WeChat users or a subset of the user's WeChat friends to see all or a subset of the Public Numbers the user follows. In certain embodiments, such authorization is implemented by the user checking or otherwise choosing the WeChat users, or by switching a "Yes/No" switch or the like for a Public Number to "Yes" to grant authorization.

In yet another aspect, there is provided a tab "Location Service" or the like in WeChat. A user can click a "Location Service" tab or the like to choose whether or not to subscribe to the location of one or more Public Numbers in his or her WeChat profile. In one embodiment, a user tracks the physical location of one or more Public Numbers, for example, on a map or by longitude/latitude coordinates. In one embodiment, the location or map service is provided by WeChat or Tencent Technology (Shenzhen, China), or by other service providers such as Google, Bing, Apple and MapQuest. In preferred embodiments, the user has the permission from a Public Number or a WeChat user to track or subscribe to its location. In one aspect, such permission is granted in the Public Number or WeChat user's WeChat account. In certain embodiments, a user checks or otherwise chooses a Public Number to be tracked, or switches a "Yes/No" switch or the like to "Yes" to track or subscribe to the location of the Public Number.

As disclosed herein, "My Apps" can provide a stable and intuitive point of entry for a user to view, access, and manage the Public Numbers that he or she follows. In one embodiment, one or more Public Numbers in "My Apps" can be synchronized with one or more user device. In preferred embodiments, clicking on an icon for a Public Number leads to the homepage of the Public Number. In one embodiment, the homepage of a Public Number does not provide a graphical user interface for searching. In preferred embodiments, the content of the Public Number homepage is automatically updated to reflect the content at the time a user visits the Public Number homepage. In other embodiments, a user may set the manner, time, and/or frequency of how a Public Number homepage is to be updated on a user device. For example, a user can set a Public Number homepage to "freeze" at a certain time, to be manually updated, to be automatically updated at noon every day, or to be updated every hour, or any combination thereof. A starting time point or an end time point for an update may also be specified.

In one aspect, the "My Apps" feature can also provide a reminder to cancel subscription to one or more Public Numbers. In one embodiment, a reminder is shown for a user who has subscribed to more than a given number of Public Numbers. In preferred embodiments, a server, for example, a WeChat server or a Tencent Server, controls whether a reminder is provided. In one aspect, the server sets the limit of the number of Public Numbers a user can subscribe to. In other embodiments, a user may set the limit of the number of Public Numbers the user can subscribe to. In one aspect, once provided, the reminder does not automatically disappear, and it disappears after a user clicks it once. In one embodiment, a user clicks and views a reminder, and removes subscribed Public Numbers one by one, according to his or her needs. In another embodiment, a user clicks and views a reminder, and clicks a "Return" button or the like to return to the previous interface. In one aspect, a reminder to cancel subscription does not provide a "Cancel Subscription" button or the like per se.

In any of the embodiments disclosed herein, a server, for example, a WeChat server or a Tencent server, controls one or more functionalities. For example, a server may control the order or manner of how Apps are arranged in "My Apps." In one aspect, a server controls the settings of the Apps or Public Numbers. In another aspect, a reminder to cancel subscription is sent by a server, which provides a list of Public Numbers recommended for unsubscription. In yet another aspect, a server controls the verification of a Public Number's profile. In certain embodiments, the verification process is implemented by Weixin verification, Sina Weibo verification, or Tencent Weibo verification. In one aspect, a server controls the description of the functionalities to be verified. In one aspect, a verified Public Number's profile should have check marks for each and every items indicating successful verification, no matter how the verification is implemented.

In one embodiment, the "My Apps" feature does not provide a reminder of one or more unread messages in a Public Number. Alternatively, there is provided a reminder of one or more unread messages in a Public Number by the "My Apps" feature of the present disclosure. In one aspect, in a dialogue interface, a Public Number is shown as an icon. In one embodiment, a Public Number pushes a message to a user, and there is provided a blank dot on the Public Number icon indicating the Public Number contains unread messages. After a user visits a Public Number, the number of unread messages is shown.

In one embodiment, a Public Number can be labeled as a "Star Friend" in a user's contact list. In one aspect, a Public Number or App listed in "My Apps" cannot be labeled as a "Star Friend." In certain embodiments, the number of "Star Friends" in a user's contact list cannot exceed four. If a user labels more than four "Star Friends" in his or her contact list, there is provided a reminder that one or more stars need to be removed before additional friends can be labeled with stars. However, in one aspect, such reminder does not direct the user to an interface to remove the stars.

Figure 5:
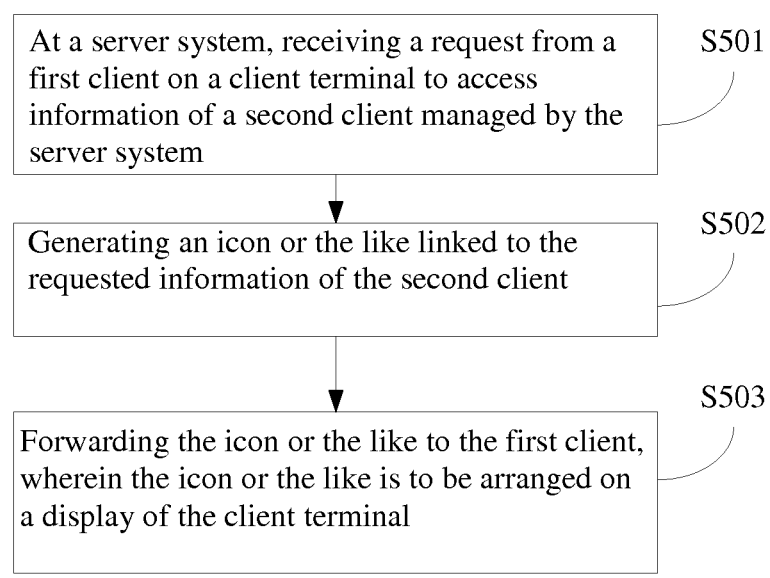
FIG. 5 is a flow chart illustrating exemplary steps of a method for providing a first client with access to information of a second client managed by a server system, according to an embodiment of the disclosure.
Figure 6:
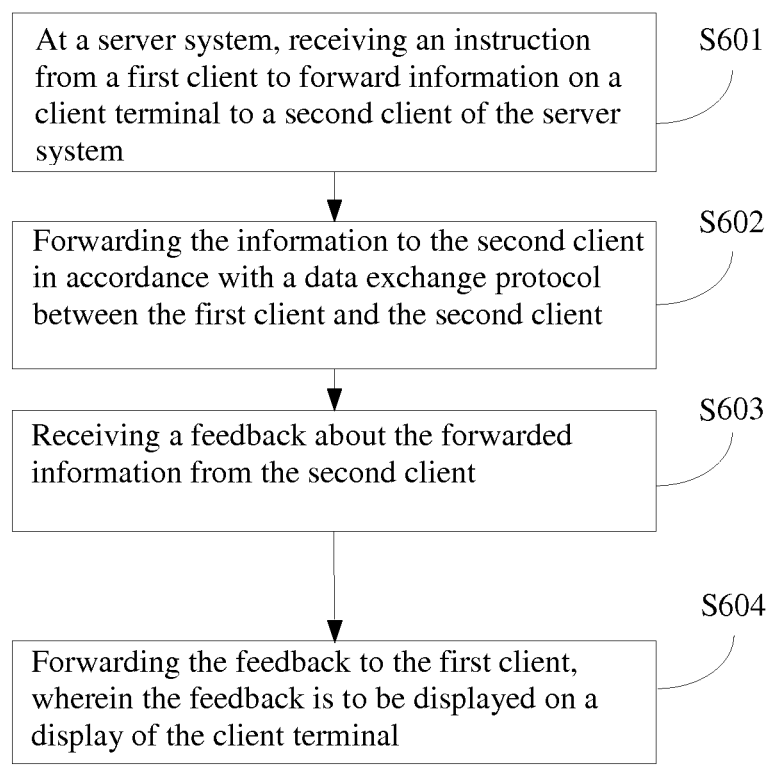
FIG. 6 is a flow chart illustrating exemplary steps of a method for forwarding information on a client terminal from a first client of a server system, according to an embodiment of the disclosure.
Figure 7:
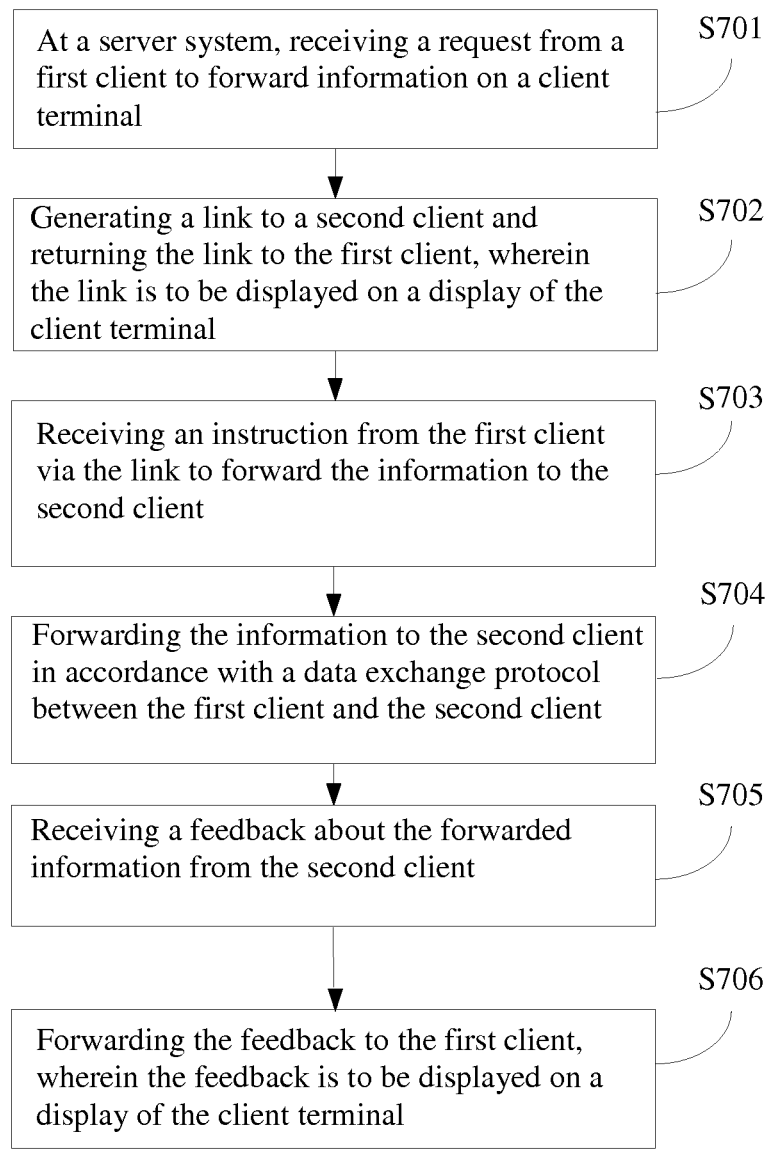
FIG. 7 is a flow chart illustrating exemplary steps of a method for forwarding information on a client terminal from a first client of a server system, according to an embodiment of the disclosure.
Figure 8:
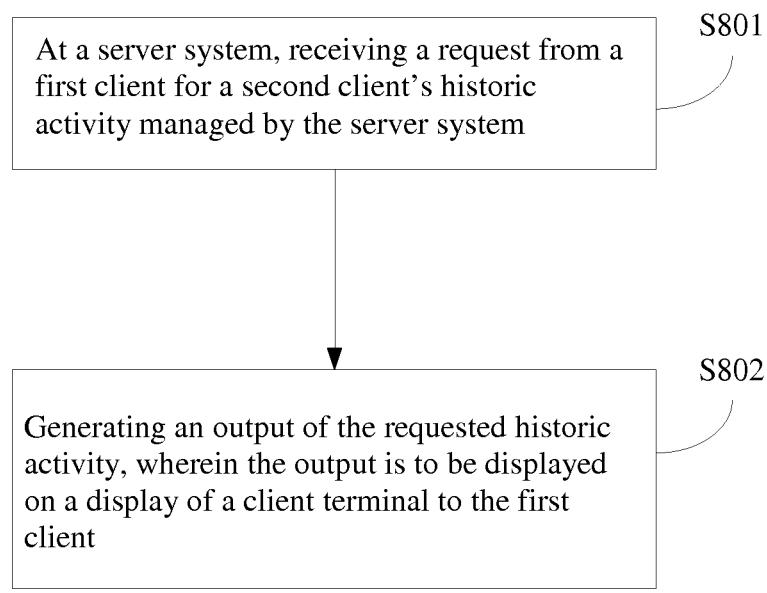
FIG. 8 is a flow chart illustrating exemplary steps of a method for providing a first client with a second client's historic activity managed by a server system, according to an embodiment of the disclosure.

Also disclosed herein is a method for providing a first client device with access to information of a second client device managed by a server system. Referring to FIG. 5, in one embodiment, the method includes, at the server system having one or more processors and memory for storing programs to be executed by the one or more processors, a step of receiving an information access request from the first client (S501). In response to the information access request, an icon or the like linked to the requested information of the second client is generated at the server system (S502). In one embodiment, the method further includes a step S503 of forwarding the icon or the like to the first client. In any of the foregoing embodiments, the icon or the like can be arranged on a display of the client. In any of the foregoing embodiments, the icon or the like can comprise information identifying the second client.

Figure 9:
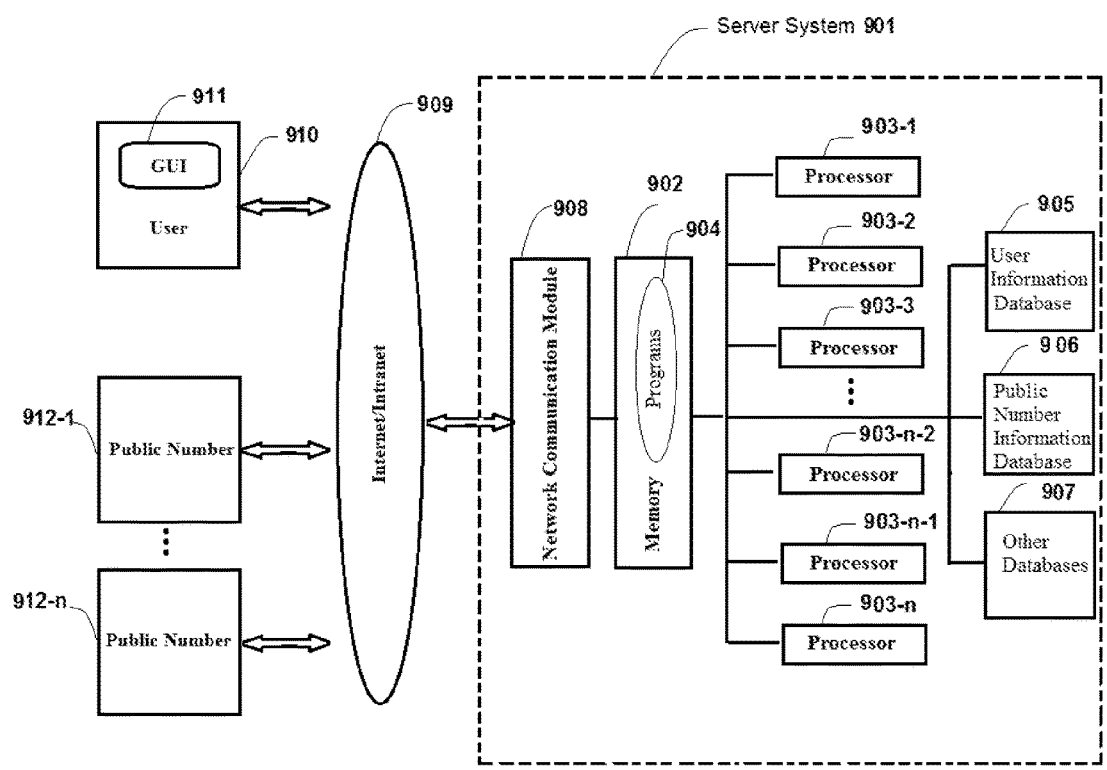
FIG. 9 is a schematic diagram illustrating an exemplary embodiment of a server system, according to an embodiment of the disclosure.

Referring to FIG. 9, also provided herein is a server system 901, comprising memory 902; one or more processors 903-1, 903-2, . . . , 903-*n*; and one or more programs 904 stored in memory 902. In one embodiment, provided herein is a server system for providing a first client 910 with access to information of a second client 912 (for example, one or more Public Numbers 912-1, . . . , 912-*n*) managed by server system 901. In one embodiment, the one or more programs 904, when executed by the one or more processors, cause the server system to: receive an information access request from the first client on a client terminal (S501); in response to the information access request, generate an icon or the like linked to the requested information of the second client (S502); and forward the icon or the like to the first client (S503), wherein the icon or the like is to be arranged on a display of the client terminal, wherein the icon or the like comprises information identifying the second client. In one embodiment, server system 901 comprises databases including a user information database 905, a Public Number database 906, and other databases 907. In one aspect, server system 901 communicates via a network communication module 908 with Internet/Intranet 909, with which user devices 910 and one or more Public Numbers 912-1, ..., 912-n also communicate. In preferred embodiments, user device 910 connects with server system 901 with a user terminal having a graphical user interface (GUI) 911.

In any of the foregoing embodiments, the icon or the like can be positioned within a matrix on a display, for example, a "My Apps" screen 206 on a mobile device. In any of the preceding embodiments, the server system can be an instant messaging server system, for example, one for WeChat. In preferred embodiments, the server system can control the arrangement of the icon or the like on the display, for example, the order of Apps and Public Numbers on a "My Apps" screen, and the number of Apps and Public Numbers per page. In preferred embodiments, the server system can control the setting of the Public Number, for example, the frequency of a Public Number sending out updates, whether and how to send unread message reminders, and which subgroup of users to send updates to. In other embodiments, the server system controls the verification of the Public Number, for example, the verification of a Public Number's profile implemented by Weixin verification, Sina Weibo verification, or Tencent Weibo verification. In any of the preceding embodiments, the Public Number can be associated with the user's WeChat account managed by the server system. In preferred embodiment, the Public Number can be synchronized between the server system and the client terminal. For example, updates from the Public Number can be pushed from the server system to the client terminal. When a user deletes, edits, or moves the position of a Public Number App in "My Apps," corresponding information in the user's account (for example, a user account stored in a user information database 905) of the server system will be updated. Therefore, the user can view the updated "My Apps" even when the user logs into his or her WeChat account from another device.

III. Connector

A user may connect with one or more Public Numbers or users in a variety of ways. For example, a user can follow the following steps: 1) open or go to a document; 2) select all or part of the document; 3) copy the selected content; 4) open or switch to a page of a Public Number; 5) open an entry box, text box, entry field or the like in the Public Number page; 6) paste the selected content in the entry box or field; 7) send the content, for example, as a message, to the Public Number. The presence or location of an entry box and the steps to open and operate in the entry box may be specific to each Public Number. This method requires a user to perform many steps in order to connect with a Public Number. In particular, this method requires a user to exist, at least temporarily, an interface of the content that is to be communicated to a Public Number. In certain cases, each of the selecting, copying, and/or pasting steps is prone to errors, due to the many steps involved, the necessity to switch between programs and/or interfaces, and/or the need to locate, open, and operate in an entry box or field. In addition, the types of documents that can be supported by this method may be limited. For example, a Public Number may only support entry of text or expressions in its entry field, and may not allow video or audio files to be pasted. Thus, this method may lead to a less than satisfactory user experience and low efficiency of communication between a user and a Public Number or another user.

Provided herein is a feature of connecting a user and one or more Public Numbers, applications ("Apps"), or users. In one embodiment, a user is connected to one or more Public Numbers, Apps, or users by a "Connector" feature of the present disclosure, or the like. In some embodiments, a WeChat user is connected by a "Connector" feature of the present disclosure, to one or more Public Numbers, Apps, or users that the user follows. In one aspect, a Connector serves to forward a message, a file, or a document to one or more Public Numbers, Apps, or users. In one aspect, the one or more Public Numbers, Apps, or users can be third parties, which provide service or information to a user through WeChat. In one embodiment, a third party App (or Public Number) provides the capability to process, save, and/or edit a forwarded message, file, or document. In another embodiment, a third party App (or Public Number) processes, saves, and/or integrates messages, files, or documents forwarded by users. In one aspect, the processed or integrated messages, files, or documents can be provided by the App or Public Number to one or more users. Thus, provided herein is a feature that allows entry of third party information into a Public Number. The feature facilitates the interaction between a user and a Public Number, between multiple users and a Public Number, and between a user and multiple Public Numbers.

In one aspect, a Connector connects a user to a Public Number the user follows. In one aspect, a Connector connects a user to a Public Number or a user of the user's choice. For example, a user may specify which Public Number or user to connect using a Connector of the present disclosure. In certain embodiments, a user connects to multiple Public Numbers or users at the same time using a Connector. In another aspect, a Connector provides a user with more than one Public Numbers, applications, or users, from which the user can choose which one or more to connect.

In one aspect, using a Connector feature of the present disclosure, a user can save one or more documents to a destination of his or her choice. Such a destination includes but is not limited to an App, a Public Number, a user interface, a forum, a blog, a folder, a webpage, an account (for example, a Social Network account), a bookmark, a dock, a desktop, or any combination thereof.

Figure 3A:
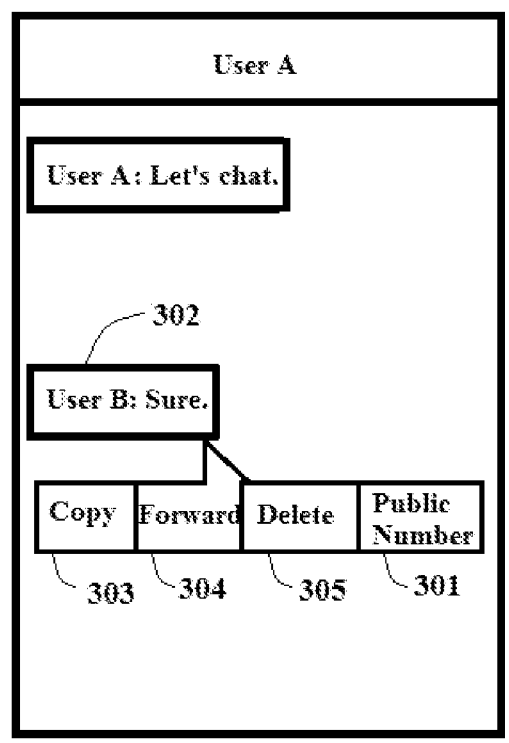
FIGS. 3A-3D are exemplary screen shots of "Connector," according to an embodiment of the disclosure.

In another aspect, a user saves one or more documents to a Public Number using a Connector. For example, a WeChat user can save the contents of a Weixin (or a WeChat message, e.g. a WeChat text message, or a WeChat voice message) to a Public Number. In one embodiment, a WeChat text message is saved to a Public Number through a Connector. In another embodiment, a WeChat voice message is not saved through a Connector to a Public Number. In certain embodiments, a first user taps, clicks, or otherwise selects a WeChat message, from among the messages between the user and a second WeChat user. In one aspect, the second user is a WeChat friend with the first user. In another aspect, the first user may select a WeChat message from him or herself, or a WeChat message from the second user. In cases where there can be multiple participants or WeChat users in a WeChat conversation or thread, any message from any of the participants may be selected for use in a Connector feature. In certain embodiments, a multiplicity of messages (for example, at least 2, at least 3, or at least 4 messages) may be selected at the same time for connecting to a Public Number. After one or more messages are selected, there is provided a "Public Number" tab or the like 301 to connect the selected message(s) to one or more Public Numbers. In one embodiment, a "Public Number" tab or the like 301 appears after a user selects a message 302 and holds on to it for an extended period of time. In certain embodiments, along with the "Public Number" tab or the like 301, there can be provided tabs or the like for other operations, for example, a "Copy" tab or the like 303, a "Forward" tab or the like 304, or a "Delete" tab or the like 305, or any combination thereof, for example, as shown in FIG. 3A.

Figure 3B:
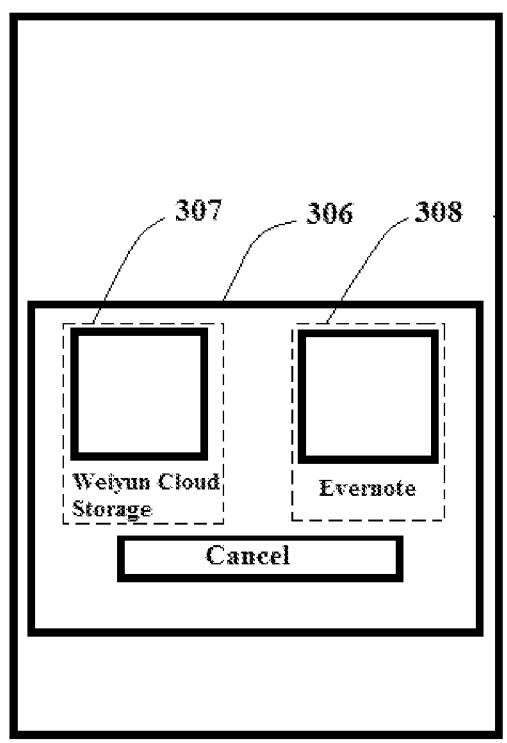

In preferred embodiments, a user clicks, taps, or otherwise selects the "Public Number" tab or the like 301 to connect the selected message(s) to one or more Public Numbers. In one embodiment, selection of the "Public Number" tab or the like 301 leads to a graphical interface 306. Graphical interface 306 can reside on a display of any suitable user device or client terminal, for example, a mobile device. In preferred embodiments, there is provided at least one Public Number. The graphical interface 306 may comprise a list, a table, a matrix, or a combination thereof, and comprise one or more Public Number, for example, as shown in FIG. 3B. In certain embodiments, a user customizes the Public Numbers shown in the graphical interface. In other embodiments, WeChat automatically arranges the Public Numbers in the graphical interface, for example, by synchronizing with the user's "My Apps" (i.e., Public Numbers the user is following), or by selecting the Public Numbers the user visits or uses most frequently. In certain embodiments, there can be provided at least two Public Numbers to connect to. For example, in FIG. 3B, there are shown two Public Numbers 307 and 308, namely Public Number "Weiyun Shoucang" 307 (or "Weiyun" cloud storage, which are public storage accounts), and Public Number "Wode Yinxiang Biji" 308 (or "My Yinxiang Biji," "My Evernote," or "Evernote"). In certain embodiments, the "Weiyun" cloud storage is provided with the WeChat (Weixin) mobile messaging application.

In certain embodiments, a user taps, clicks or otherwise selects a Public Number and is then directed to a homepage or a dialogue interface of the Public Number. In one embodiment, there is provided a tab or the like for returning to the WeChat dialogue interface. In one example, a user taps, clicks or otherwise selects the "Evernote" Public Number, and is directed to the selected Public Number, for example, to a dialogue interface with the Public Number. The selected message(s) will be saved to and shown in the Public Number dialogue interface. In preferred embodiments, a confirmation of "Successfully Saved" or the like is provided by the Public Number. In one embodiment, the message(s) having been saved in a Public Number is shown in the Public Number, and the format of the saved message(s) is preserved. Format of a message may include font, font size, font color, message background, dimensions of the message box, and etc. In other embodiments, format of a saved message provided in a Public Number is, for example, automatically adjusted by the Public Number or WeChat. In one aspect, a saved message is enlarged or shrunk by a scale factor in size or dimension. In another aspect, only a portion of a saved message may be shown in a Public Number, and a user can select the message to view the full content. In one embodiment, a user is directed to another screen or to a pop-up screen to view the full content. It is to be understood that a saved message in a Public Number can be edited, and the editing functionalities may be provided by the Public Number and/or WeChat.

In this example, a user first adds or follows an "Evernote" Public Number. In one embodiment, a user bundles or otherwise associates an Evernote account with the "Evernote" Public Number. After then Evernote account and the "Evernote" Public Number can be bundled or associated, a user can save messages or other contents in the "Evernote" Public Number. In one embodiment, there is provided a notebook (or pad) or the like tagged as "Weixin Public Number" or "WeChat Public Number" or the like in the user's Evernote account.

Therefore, provided herein is a Connector feature that facilitates flow of information, for example, a message between a user and a contact (e.g., a WeChat friend), from between the user and the contact to between the user and a Public Number.

A Connector may be used to save to one or more Public Numbers any type/format of documents, including but not limited to, a picture, an article, a video, an audio, a text, a webpage, a link, location, music, a name card, a business card, a self-defined expression, an emoticon, or any combination thereof in one document. In certain embodiments, a document comprises contents in one or more types or formats. For example, a user can save a message comprising text, a picture and a website link to a Public Number.

Figure 3C:
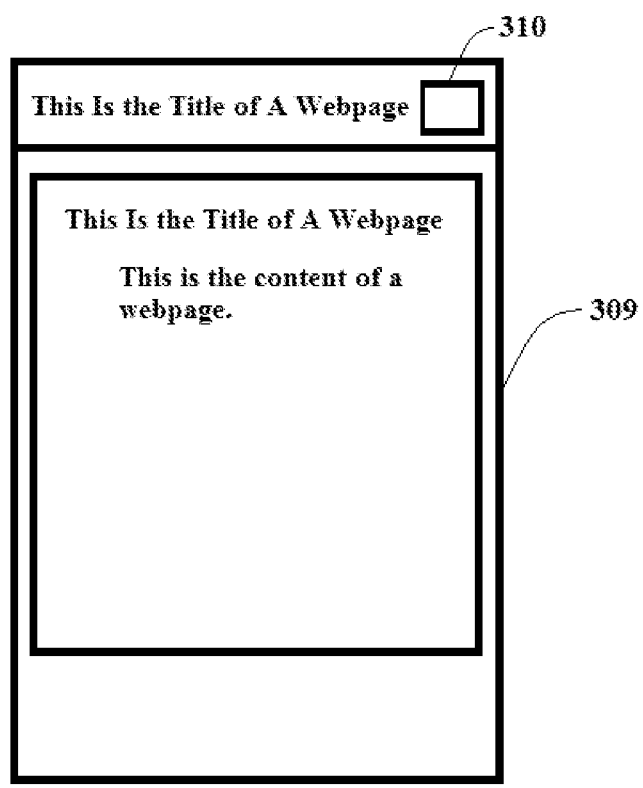
Figure 3D:
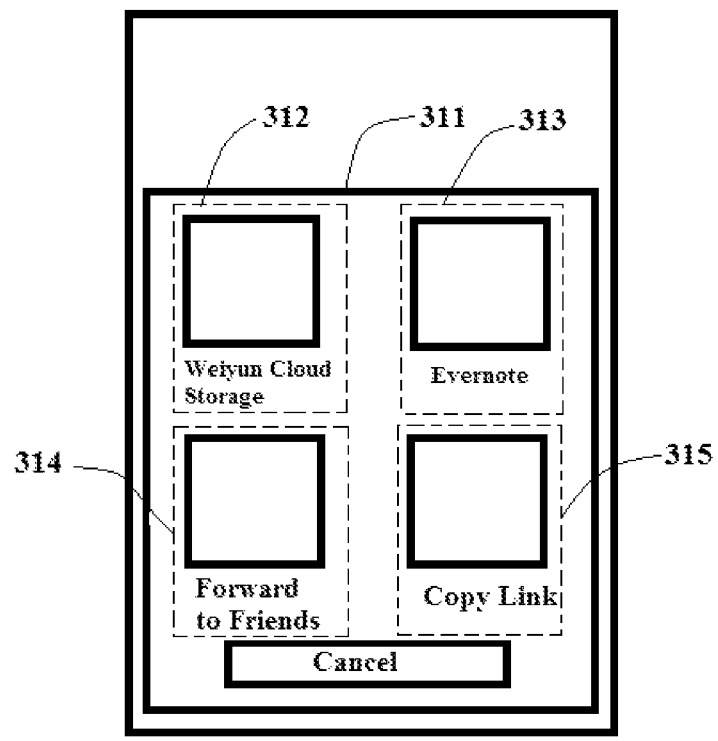

A Connector may be initiated from various interfaces. In certain embodiments, such interfaces can be within WeChat. In other embodiments, the interface for a Connector may be outside the WeChat application. In the example shown in FIG. 3C, a user webpage 309 is shown. There is provided a tab or the like (for example, a tab 310 is shown on the upper right corner of the user webpage 309 of FIG. 2C) which a user can click, tap, or otherwise select. In one embodiment, selection of the tab or the like leads to a graphical interface. In preferred embodiments, there is provided at least one Public Number in the graphical interface 311. The graphical interface 311 shown in FIG. 3D may comprise a list, a table, a matrix, or a combination thereof, and comprise one or more Public Numbers. Graphical interface 311 may reside on a display of any suitable user device or client terminal, for example, a mobile device. In certain embodiments, there can be provided at least two Public Numbers to connect to. For example, in FIG. 2D, there are shown two Public Numbers, namely "Weiyun" cloud storage 312 and "Evernote" 313. In certain embodiments, besides Public Numbers, there can be provided in the graphical interface 311 other functionalities. For example, there can be provided an icon or the like 314 for forwarding to a friend, an icon or the like for sharing in "My Friend Circle," an icon or the like for sharing in Tencent Weibo, and/or an icon or the like 315 for copying the link to the webpage. In certain embodiments, a user customizes the Public Numbers and additional functionalities shown in the graphical interface. In other embodiments, WeChat automatically arranges the Public Numbers and additional functionalities in the graphical interface, for example, by synchronizing with the user's "My Apps" (Public Numbers the user is following), or by selecting the Public Numbers and additional functionalities the user visits or uses most frequently. In certain embodiments, a user taps, clicks or otherwise selects a Public Number and is then directed to a dialogue interface of the Public Number. In one embodiment, there is provided a tab or the like for returning to the webpage. In another embodiment, there is provided a tab or the like for accessing a WeChat interface, for example a WeChat dialogue page or a WeChat contact list. In one example, a user taps, clicks or otherwise selects the "Evernote" Public Number, and is directed to the selected Public Number, for example, to a dialogue interface with the Public Number. The webpage is then saved and shown in the Public Number dialogue interface. In preferred embodiments, a confirmation of "Successfully Saved" or the like is provided in the Public Number. In certain embodiments, the format of a saved webpage in a Public Number is, for example, automatically adjusted by the Public Number or WeChat. In one aspect, only a link of a saved webpage is saved and shown in a Public Number dialogue interface. In a further embodiment, the title of a saved webpage is saved and shown in a Public Number dialogue interface. In one aspect, a saved webpage is enlarged or shrunk by a scale factor in size or dimension. In another aspect, only a portion of a saved webpage may be shown in a Public Number, and a user can select the message to view the full content. In one embodiment, a user is directed to another screen or to a pop-up screen to view the full content. In another embodiment, the format of a saved webpage is preserved.

In any of the embodiments described herein, wherein a Connector provides a Public Number that a user can choose to connect to, the Public Number is verified. In one embodiment, the Public Number is verified by WeChat or another service provided by Tencent Technology (Shenzhen, China). In one aspect, Public Numbers that already have an entry field, a portal or the like for users to send documents or messages are not automatically provided to a user through a Connector. In one embodiment, a Public Number is provided to a user through a Connector, after WeChat or another service provided by Tencent Technology (Shenzhen, China) verifies the Public Number.

A Connector of the present disclosure is not limited to saving a message or document to a Public Number. In one aspect, a Connector allows a user to communicate information to and from a destination. Such a destination includes but is not limited to an App, a Public Number, a user interface, a forum, a blog, a folder, a webpage, an account (for example, a Social Network account), a bookmark, a dock, a desktop, or any combination thereof. In one embodiment, a Connector provides a portal for interaction and exchange of information between a user and a Public Number. In another embodiment, a Connector facilitates information processing by both a user and a Public Number. In one embodiment, a Connector provides an intuitive user interface such that a user would understand the action to take in order to process any piece of information. For example, after receiving a text in a foreign language, a user may use a Connector to send the text to a Public Number providing translation services. A Connector in this case eliminates the need to select, copy and paste the foreign language text, and facilitates the receipt and processing of the translation service request. In this example, a user may only want to have a portion of the foreign language text translated. In this case, a user can edit the message by deleting the portion that is not to be translated, either before using a Connector or after using a Connector to send the message to a Public Number. Alternatively, specific instructions may be provided to the Public Number in a message.

In one embodiment, provided herein is a Connector feature that is based on user context and/or on likely topics currently being focused-upon by the user. In one aspect, a Connector can additionally provide suggestions or offerings to a user based on system determined contexts of the user, on system determined topics of most likely current focus, and/or based on historic activities of the user in the system. In a specific embodiment, a Connector disclosed herein maintains logically interconnected and continuously updated representations of communal spaces (e.g., topic space, keyword space, URL space, context space, content space and so on) among multiple users, and/or between a user and a Public Number. By automatically determining where in at least one of these spaces a given user's interest may be, the system can automatically provide information of Public Numbers or other functionalities the user likely wants.

In another aspect, a Connector of the present disclosure is used for online purchases and payments. In one embodiment, a user decides to purchase a computer online, for example, from Amazon.cn. When the user checks out, there is provided a Connector, providing the user an option to pay with MyChat. In one embodiment, the user's WeChat number is associated or bound with a bank card, During the binding process, a WeChat client terminal directly communicates with a server of an online payment company (e.g., CaiFuTong) to process the binding. When a user chooses to pay with WeChat, a WeChat client terminal again directly communicates with a server of an online payment company to process the payment. In one embodiment, WeChat does not receive or retain the user's bank card information. Similarly, a Connector is used for online purchases and payments for any services or information. Methods, terminals, and systems for making payment with a messaging application on a mobile device are described in detail in another application entitled "Method, Terminal, and System for Making Payment with a Messaging Application on a Mobile Device," the disclosure of which is incorporated herein in its entirety.

In another aspect, a user may conduct online searches for a computer to purchase. In one embodiment, there is provided a Connector, providing the user with an option to purchase a computer from a Public Number that offers computers. In one aspect, a Public Numbers that offers computers within the user's search results is provided in a Connector. A user can buy from a Public Number provided in the Connector, by clicking an image of the item provided within the Public Number, or by scanning a 2D code posted by the Public Number using WeChat. In one embodiment, the order page provided by the Public Number has a "Verified by WeChat" logo or the like to increase the security of the purchase. In one aspect, a user is asked to place an order only when the logo is shown.

In another aspect, there is provided a Connector for inter-App calling. In one embodiment, the inter-App calling is inter-Public Number calling. There is an increasing number of e-commerce companies each having their own mobile App selling their products or services. In one embodiment, a user wants to make a purchase from one of those Apps, and there is provided a Connector allowing the user to connect to or call the WeChat App installed on the same user device. After payment is made through WeChat, the user can choose to return to the other App or remain in WeChat. In another aspect, a user may want to purchase an item listed in WeChat, for example, listed by a WeChat Public Number. In this case, there is provided a Connector allowing the user to connect to or call another App installed on the same mobile device and make a payment using the App. Additionally, a user may want to purchase an item listed by a Public Number, but the item may be out of stock or not exactly what the user want. In this case, there is provided a Connector providing a list of other Public Numbers that may have this item or other similar items for sell. The user thus uses the Connector to connect to another Public Number to make a purchase.

In another aspect, there is provided a Connector for interaction between a user and a live person. In a preferred embodiment, such an interaction provided by the Connector is a real-time interaction. In one aspect, the liver person is a customer service representative, for example, one representing a Public Number.

A Connector may be used to process or forward any type or format of information, including but not limited to, a picture, an article, a video, an audio, a text, a webpage, a phone call, a link, location, music, a name card, a business card, a self-defined expression, a computer code, a software package, or any combination thereof in one document. In certain embodiments, a piece of information comprises contents in one or more types or formats. For example, a user can save a message comprising text, a picture and a website link to a Public Number. In preferred embodiment, the information being processed or forwarded by a Connector is verified by WeChat or another service provided by Tencent Technology (Shenzhen, China).

Also disclosed herein is a method for forwarding information on a client terminal from a first client of a server system, the method comprising: at the server system having one or more processors and memory for storing programs to be executed by the one or more processors, receiving an instruction from the first client to forward information to a second client of the server system (S601); forwarding the information to the second client in accordance with a data exchange protocol between the first client and the second client (S602); receiving a feedback about the forwarded information from the second client (S603); and forwarding the feedback to the first client (S604), wherein the feedback is to be displayed on a display of the client terminal. In one embodiment, the method is implemented via a Connector feature of the present disclosure.

In another embodiment, a method for forwarding information on a client terminal from a first client of a server system is provided, the method comprising: at the server system having one or more processors and memory for storing programs to be executed by the one or more processors, receiving a request from the first client to forward information on the client terminal (S701); in response to the request, generating a link to a second client and returning the link to the first client (S702), wherein the link is to be displayed on a display of the client terminal; receiving an instruction from the first client via the link to forward information to the second client (S703); forwarding the information to the second client in accordance with a data exchange protocol between the first client and the second client (S704); receiving a feedback about the forwarded information from the second client (S705); and forwarding the feedback to the first client (S706), wherein the feedback is to be displayed on a display of the client terminal. In one embodiment, the method is implemented via a Connector feature of the present disclosure.

Referring to FIG. 9, also provided herein is a server system 901, comprising memory 902; one or more processors 903-1, 903-2, . . . , 903-n; and one or more programs 904 stored in memory 902. In one embodiment, provided herein is a server system for forwarding information on a client terminal from a first client 910 of server system 901. In one embodiment, the one or more programs 904, when executed by the one or more processors, cause the server system to: receive an instruction from the first client 910 to forward information to a second client 912 of the server system (S901); forward the information to the second client 912 in accordance with a data exchange protocol between the first client 910 and the second client 912 (S902); receive a feedback about the forwarded information from the second client 912 (S603); and forward the feedback to the first client 910 (S604), wherein the feedback is to be displayed on a display of the client terminal, for example, on GUI 911. In one embodiment, server system 901 comprises databases including a user information database 905, a Public Number database 906, and other databases 907. In one aspect, server system 901 communicates via a network communication module 908 with Internet/Intranet 909, with which user 910 and one or more Public Numbers 912-1, . . . , 912-n also communicate.

IV. Historic Messages

Provided herein is a feature by which a user can view historic messages of a user. In one aspect, a user can view his or her own historic messages, for example, previous messages, previously published information, saved documents, contacts, or activities, including but not limited to previous text messages with one or more other users or Public Numbers, previously forwarded messages, previous voice messages, previously viewed, forwarded or edited documents, previous contacts, and previously viewed users or Public Numbers. In certain embodiments, a user can view or otherwise identify other users or Public Numbers who have visited the user.

In another aspect, a first user can view historic messages of a second user or a Public Number. In one aspect, the first user and the second user can be WeChat friends and have previously engaged in exchanging messages. In this case, the first user can view historic messages from the first user him or herself or from the second user, for example, by visiting a WeChat page of the second user, and accessing a "Historic Messages" tab or the like. In another aspect, the first user and the second user may not be WeChat friends and have not previously engaged in exchanging messages. In this case, there is provided a feature by which the first user may view the second user's historic messages. After viewing the second user's historic messages, the first user may or may not decide to add the second user as a WeChat friend. In some embodiments, the first user does not have to be a WeChat friend in order to view historic messages of the second user.

Figure 4:
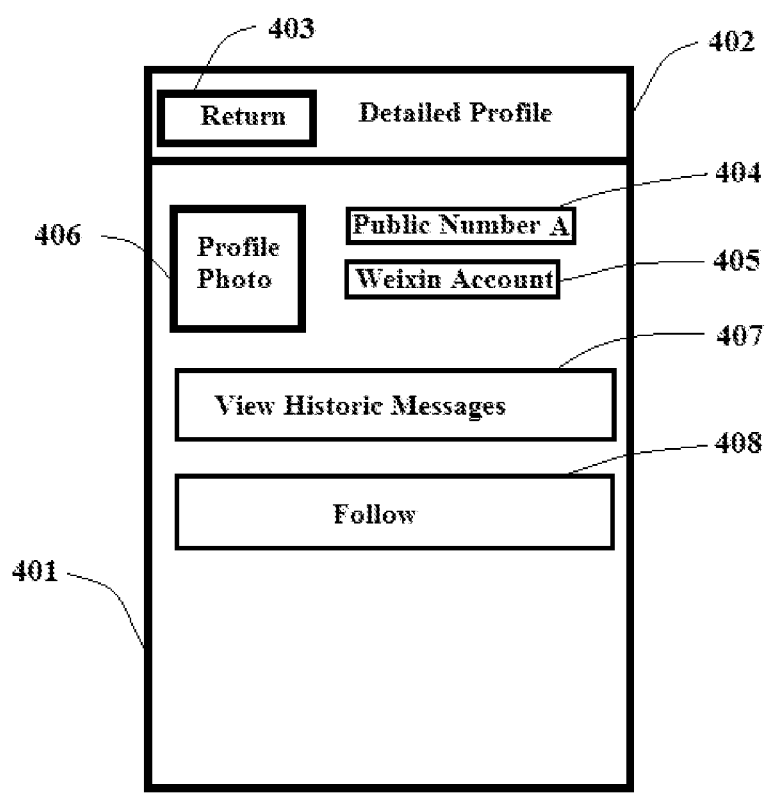
FIG. 4 is an exemplary screen shot of "Historic Messages," according to an embodiment of the disclosure.

In yet another aspect, there is provided a "Historic Messages" feature by which a user views historic messages from a Public Number, without having to follow the Public Number. In one embodiment, before deciding whether to follow a Public Number after obtaining a search result containing the Public Number, a user can view the Public Number's historic messages, e.g., information previously published by the Public Number. For example, in FIG. 4, there is shown a graphical interface 401 of a Public Number. Graphical interface 401 may reside on a display of any suitable user device or client terminal, for example, a mobile device. In one embodiment, graphical interface 401 comprises a title line "Detailed Profile" or the like 402, indicating the interface provides profile information of the Public Number. In certain embodiments, there is provided a "Return" tab or the like 403 to return to a search result. The graphical interface 401 may comprise the Public Number's name 404 (or WeChat name), nick name, Weixin account 405, profile picture or photo 406, profile from Sina Weibo, a "View Historic Messages" tab or the like 407 linked to the Public Number's historic messages, a "Follow" tab or the like 408 that allows a user to follow the Public Number, or any combination thereof. In cases where a Public Number in the search results is already being followed by the user, additional information or functionalities may be available to the user in the Public Number's profile. The user may choose whether to receive messages from the Public Number, whether to show in the user's profile that the Public Number is being followed by the user, or whether to discontinue following this Public Number.

After a user clicks a "View Historic Messages" tab or the like on a Public Number's graphical interface, the user can view messages, posts or other information the Public Number has published. The historic messages may be arranged in any order or manner on the screen or the graphical user interface. For instance, the Public Numbers may be arranged in a vertical order from top to bottom of a screen. In one embodiment, the messages, posts or other information can be listed in reverse chronological order. For example, the most recently published information is listed on the top. In one aspect, a user can scroll down to review more historic messages. In one embodiment, the messages, posts or other information can be listed in chronological order. For example, the most recently published information is listed on the bottom. In one aspect, a user can scroll up to review more historic messages.

In one embodiment, a user can view ten most recent historic messages of a Public Number without following the Public Number. In another embodiment, a user can view all the historic messages of a Public Number after following the Public Number. In one aspect, a server controls the number of historic messages that a user can see, before or after the user follows the Public Number. In one embodiment, the server is a WeChat server or a Tencent server. In another aspect, a Public Number controls the number of historic messages that a user can see, before or after the user follows the Public Number.

In one embodiment, a message is shown in "Historic Messages" when it is sent by a Public Number to all the users that follow the Public Number. In another embodiment, if a message is sent by a Public Number to fewer than all the users that follow the Public Number, the message is not shown in "Historic Messages." In certain embodiments, a Public Number controls which message show up in its "Historic Messages." In other embodiments, a server, for example, a WeChat server or a Tencent server, controls which message is shown in a Public Number's "Historic Messages." In a further embodiment, a WeChat server or a Tencent server controls how historic messages can be displayed, for example, the format in which historic messages can be displayed. In yet another embodiment, provided herein is a control algorithm for enabling a client or user of a messaging server system to view historic messages of a Public Number, and such a control algorithm does not require the client or user to follow or become a friend of the Public Number. In one aspect, an algorithm for controlling a Public Number's historic messages at a server system is also provided.

A Public Number's historical messages may be in any type/format. For example, a historic message can be a picture, an article, a video, an audio, a text, a webpage, a link, location, music, a name card, a business card, a self-defined expression, or any combination thereof in one file. In certain embodiments, a historic message comprises contents in one or more types or formats. In one aspect, when a user clicks on a historic message comprising text and picture, the user is directed to a graphical interface to view the message. In one embodiment, the graphical interface further comprises a "Read Original Article" link or the like, which a user clicks to view the article in an outside website. In another aspect, a user clicks an audio historic message to play the audio in WeChat or another application or program. In another aspect, a user clicks a music historic message to play the music in WeChat or another application or program. In yet another aspect, a user clicks a video historic message to play the video in WeChat or another application or program. In one embodiment, a text-only historic message does not respond when a user clicks it. In one embodiment, a picture or photo historic message is enlarged, in the same screen or in another screen, after a user clicks it. In any of the embodiments disclosed herein, there is provided a Connector feature to forward or connect a historic message to a Public Number or an App. For example, a historic message of a first Public Number may be forwarded and saved to a second Public Number through a Connector.

In certain embodiments, a user may need to scroll up or down in order to locate, view, or access a particular historic message. For example, a user may wish to see if the Public Number has published in a particular area of interest, before deciding to follow the Public Number. However, this can be difficult because smart phones or other mobile devices may not have display screens large enough to show many historic messages. Provided herein are quick and intuitive ways for identifying if a Public Number has published in certain topics. In certain embodiments, a user may conduct a search within a Public Number's historic messages. In one aspect, the search function is provided by WeChat. For example, there is provided a "Search in Historic Messages" button linked to a graphical user interface which comprises at least one input portion and a "Search" command or the like. A query including one or more search terms may be received via the input portion of the graphical user interface. In one embodiment, a user clicks the input portion and brings up a keyboard screen to enter one or more search terms. In another embodiment, the entry of one or more search terms is implemented by a user speaking the one or more search terms, and subsequent voice recognition and search term entry. In one aspect, the voice recognition function is provided by WeChat. In another aspect, the voice recognition function is provided by the user's device. In yet another aspect, WeChat enhances or improves the voice recognition function provided by the user device. The user may choose any search term or any combination of search terms, in order to perform the search.

In one embodiment, a user can also search for information published by the Public Number at a specific time, for example, on a given day, or within a specific time period, for example, in the last three days.

In certain embodiments, advanced search within a Public Number's historic messages is provided in WeChat. For example, a query may combine search terms in different fields, including in the body of the message, in the title, or in the time the message was published or edited. Search terms in a multiple-term search query may be combined with an "AND" or an "OR" connector, in an order and combination of a user's choice to maximize the odds of retrieving results of best match. In certain embodiment, wild cards may be used in one or more search terms. In a further embodiment, a fuzzy search is supported in WeChat for historic messages. In one aspect, a fuzzy search locates historic messages that are likely to be relevant to a search parameter or term even when the parameter or term does not exactly correspond to the desired information. In a further embodiment, a switch between traditional Chinese and simplified Chinese searches is provided in WeChat.

In one aspect, search results associated with the query can be provided and sorted by best matches. In certain aspects, hits for the search terms within the displayed search results can be highlighted, for example, as colored text, bold text, underlined text, or text with colored shade, or a combination thereof. A user selection may be received, and in one aspect, a user selection directs the user to the selected historic message.

In one embodiment, there is provided a graphical interface for a selected historic message. Such a graphical interface may comprise the time the selected historic message was published or last edited, a title line, and all or part of the body of the message. In one embodiment, such a graphical interface is a snapshot of the original published message. In one embodiment, the graphical interface further comprises a "Read Original Article" link or the like.

In certain embodiments, a Public Number controls the publication of a historic message in various ways. For example, paying users can receive certain messages before non-paying users. In one aspect, a Public Number decides when to publish a historic message and which historic messages to publish. In another aspect, a Public Number decides what segment of the public can receive or view a message. For example, a message can be visible to certain users but not others.

Provided herein is a "Historic Messages" feature that allows a user to view historic messages of a Public Number before following it. This feature allows a user to view and search for a Public Number's historic messages even when the user switches to a different user device. Therefore, the "Historic Messages" provides a Public Number with a capability to save its historic messages.

Also disclosed herein is a method for providing a first client with a second client's historic activity managed by a server system, the method comprising: at the server system having one or more processors and memory for storing programs to be executed by the one or more processors, receiving a request from the first client for the second client's historic activity (S801); and in response to the request, generating an output of the requested historic activity (S802), wherein the output is to be displayed on a display of a client terminal to the first client, wherein a data exchange protocol between the first client and the second client has not been established in the server system. In one embodiment, the method is implemented via a "Historic Message" feature of the present disclosure.

Referring to FIG. 9, also provided herein is a server system 901, comprising memory 902; one or more processors 903-1, 903-2, . . . , 903-*n*; and one or more programs 904 stored in memory 902. In one embodiment, provided herein is a server system for providing a first client 910 with a second client 912's historic activity managed by server system 901. In one embodiment, the one or more programs 904, when executed by the one or more processors, cause the server system to: receive a request from the first client 910 for the second client 912's historic activity (S901); and in response to the request, generate an output of the requested historic activity (S902), wherein the output is to be displayed on a display (for example, on GUI 911) of a client terminal to the first client 910, wherein a data exchange protocol between the first client 910 and the second client 912 has not been established in the server system 901. In one embodiment, server system 901 comprises databases including a user information database 905, a Public Number database 906, and other databases 907. In one aspect, server system 901 communicates via a network communication module 908 with Internet/Intranet 909, with which user 910 and one or more Public Numbers 912-1, . . . , 912-*n* also communicate.

In any of the foregoing embodiments, the historic activity of Public Number 912 can be a historic message. In any of the foregoing embodiments, server system 901 can control how the output of the requested historic activity is displayed, for example, the order of historic messages to be displayed, and the selected subset of users to whom a historic message is to be displayed. In preferred embodiments, a Public Number can be synchronized between a server system and a client terminal. For example, when a Public Number publishes a new message, the new message can be pushed from the server system to any client terminal so that a user who sends in a request can view the Public Number's most recent historic message, even without following the Public Number. Therefore, the user can view the Public Number's most recent historic message using any user device.

In one embodiment, a user may receive a pushed message from a Public Number comprising a particular recommendation. In one embodiment, such a pushed message is saved in a Public Number's historic messages. In another embodiment, when using a Connector feature, a user may be provided one or more recommended Public Numbers or other functionalities to connect to. Such recommendations can be based on a user's own social network contacts (e.g., WeChat friends, Facebook friends, LinkedIn connections, Twitter followers, Twitter feeds user is following, Google+ contacts, etc.). Such recommendations may be based on, for example, (i) social network contact's past activities, for example, a Public Number's historic messages indicating what the Public Number is about; (ii) size of social network contact's social network, for example, how many Public Numbers a user is already following; (iii) social network contact's relationship to a user, e.g., the contact is "Star Friend" of the user; (iv) social network contact's published messages.

In some embodiments, a search function provided herein aggregates recommendations of businesses, service providers, products, information, entertainment programs, merchants, etc., on one or more social networks including WeChat, tracks the user identifications of those making the recommendations on the social networks and retrieves the relationships between user identifications from the social networks. The search function also provides search results in response to a searching user's search query. In one embodiment, the search function selects results (e.g., Public Numbers, or Historic Messages) that are most relevant based on the search query. In other embodiments, the number of suggestions or recommendations from users that are most closely related to the searching user is also a consideration.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

I claim:

1. A method for providing a first client with access to information of a second client managed by an instant messaging server system, wherein the first client and the second client each have respective user accounts of the instant messaging server system, wherein the user account of the first client is a personal account that is a first type of user account of the instant messaging server system through which the first client exchanges instant messages with other user accounts of the instant messaging server system, and the user account of the second client is a Public Number that is a second type of user account of the instant messaging server system distinct from the first type of user account, through which the second client posts one or more documents to be broadcast to other user accounts of the instant messaging server system, the method comprising: the instant messaging server system receiving an information access request from the first client to subscribe to the Public Number of the second client by requesting information of the Public Number of the second client, wherein the information access request is generated by scanning a 2D barcode using a first user interface of an instant messaging application associated with the instant messaging server system, wherein the first user interface is displayed on a display of a client terminal through which the first client has logged into its user account at the instant messaging system, and the 2D barcode includes information identifying the Public Number of the second client;

in response to receiving the information access request generated by scanning the 2D barcode:
connecting the user account of the first client to the Public Number of the second client such that the user account of the first client is a follower of the Public Number;
generating an icon linked to the requested information of the Public Number of the second client; and
forwarding the icon to the first client, wherein the icon comprises the information identifying the Public Number of the second client, and wherein the icon is one of a plurality of icons to be arranged within a second user interface of the instant messaging application, displayed on the display of the client terminal in response to receiving the icon, each of the plurality of icons corresponding to a distinct Public Number to which the user account of the first client is subscribed, each Public Number being associated with a distinct client of the instant messaging server system;

receiving an information download request from the first client, wherein the information download request is generated by a user selection of the icon;

in response to the information download request:
generating one or more information snippets, each information snippet including a link to a respective document posted by the second client to the Public Number; and
returning the one or more information snippets to the client terminal, wherein the one or more information snippets correspond to the one or more documents posted by the second client and are to be arranged within a third user interface of the instant messaging application displayed on the display of the client terminal in replacement of the second user interface;

receiving, from the first client, a content viewing request for a respective information snippet displayed on the display of the client terminal, wherein the content viewing request is generated by a user selection of the respective information snippet within the third user interface; and in response to the content viewing request, returning, to the client terminal, a respective document posted by the second client and corresponding to the respective information snippet, wherein the respective document is to be arranged within a fourth user interface of the instant messaging application displayed on the display of the client terminal in replacement of the third user interface.

2. The method of claim 1, wherein the plurality of icons corresponding to the plurality of Public Numbers are arranged in a matrix within the first user interface.

3. The method of claim 1, wherein the client terminal is a phone, a smart phone, a computer, a tablet, a pad, a PDA, a mobile device, or any combination thereof.

4. The method of claim 1, wherein the instant messaging server system controls the order of icons, including the icon linked to the requested information of the Public Number of the second client, arranged on the display.

5. The method of claim 1, wherein the instant messaging server system controls the settings of the Public Number, and/or verification of the Public Number.

6. The method of claim 1, wherein the Public Number is associated with the user account of the first client and managed by the instant messaging server system.

7. The method of claim 1, wherein the Public Number is synchronized between the instant messaging server system and the client terminal.

8. The method of claim 1, further comprising: displaying a fifth user interface of the instant messaging application, wherein the fifth user interface includes a list of one or more user accounts that are connected to the user account of the first client as friends.

9. The method of claim 1, wherein a respective icon of a respective Public Number in the second user interface is displayed with an indication that one or more documents posted by the respective client associated with the respective Public Number are unread documents that have not been viewed by the first client.

10. A method for forwarding information on a client terminal from a first client of an instant messaging server system to a second client of the instant messaging system, wherein the first client and the second client each have respective user accounts of the instant messaging server system, wherein the user account of the first client is a personal account that is a first type of user account of the instant messaging server system through which the first client exchanges instant messages with other user accounts of the instant messaging server system, and the user account of the second client is a Public Number that is a second type of user account of the instant messaging server system distinct from the first type of user account, through which the second client posts one or more documents to be broadcast to other user accounts of the instant messaging server system, the method comprising: the instant messaging server system receiving a connect request from the first client to the Public Number of the second client of the instant messaging server system, wherein the connect request is generated by scanning a 2D barcode using a first user interface of an instant messaging application associated with the instant messaging server system, wherein the first user interface is displayed on a display of the client terminal, and the 2D barcode includes information identifying the Public Number of the second client;

in response to receiving the connect request generated by scanning the 2D barcode:
connecting the user account of the first client to the Public Number of the second client such that the user account of the first client is a follower of the Public Number;
generating an icon linked to the Public Number of the second client; and
forwarding the icon to the first client, wherein the icon comprises the information identifying the Public Number of the second client, and wherein the icon is one of a plurality of icons to be arranged within a second user interface of the instant messaging application, displayed on the display of the client terminal in response to receiving the icon, each of the plurality of icons corresponding to a distinct Public Number to which the user account of the first client is subscribed, each Public Number being associated with a distinct client of the instant messaging server system;

receiving an instruction from the first client to forward one or more documents from the first client to the Public Number of the second client of the instant messaging server system, wherein the instruction is generated by a user selection of the icon;

forwarding the one or more documents from the first client to the Public Number of the second client in accordance with a data exchange protocol between the first client and the second client;

receiving, from the second client, a feedback about the one or more forwarded documents; and forwarding the feedback to the first client, wherein the feedback is to be displayed on the display of the client terminal.

11. The method of claim 10, wherein generating the icon linked to the Public Number of the second client includes generating a link to the Public Number of the second client;

wherein the icon comprises the link.

12. The method of claim 10, wherein the client terminal is a phone, a smart phone, a computer, a tablet, a pad, a PDA, a mobile device, or any combination thereof.

13. The method of claim 10, wherein the feedback confirms processing of the one or more forwarded documents.

14. The method of claim 13, wherein processing of the one or more forwarded documents comprises saving the one or more forwarded documents in the Public Number.

15. A method for providing a first client with a second client's historic activity managed by an instant messaging server system, wherein the first client and the second client each have respective user accounts of the instant messaging server system, wherein the user account of the first client is a personal account that is a first type of user account of the instant messaging server system through which the first client exchanges instant messages with other user accounts of the instant messaging server system, and the user account of the second client is a Public Number that is a second type of user account of the instant messaging server system distinct from the first type of user account, through which the second client posts one or more documents to be broadcast to other user accounts of the instant messaging server system, the method comprising: the instant messaging server system receiving a connect request from the first client to the Public Number of the second client of the instant messaging server system, wherein the connect request is generated by scanning a 2D barcode using a first user interface of an instant messaging application associated with the instant messaging server system, wherein the first user interface is displayed on a display of a client terminal, and the 2D barcode includes information identifying the Public Number of the second client;

in response to receiving the connect request generated by scanning the 2D barcode:

connecting the user account of the first client to the Public Number of the second client such that the user account of the first client is a follower of the Public Number;

generating an icon linked to the Public Number of the second client; and forwarding the icon to the first client, wherein the icon comprises the information identifying the Public Number of the second client, and wherein the icon is one of a plurality of icons to be arranged within a second user interface of the instant messaging application, displayed on the display of the client terminal in response to receiving the icon, each of the plurality of icons corresponding to a distinct Public Number to which the user account of the first client is subscribed, each Public Number being associated with a distinct client of the instant messaging server system;

receiving a request from the first client for the second client's historic activity; and in response to the request, generating an output of the requested historic activity, wherein the output of the requested historic activity corresponds to the one or more documents posted by the second client and is to be displayed on a display of the client terminal to the first client; and receiving, from the first client, a content viewing request for a respective historic activity of the output displayed on the display of the client terminal, wherein the content viewing request is generated by a user selection of the respective historic activity; and in response to the content viewing request, returning, to the client terminal, a respective document posted by the second client and corresponding to the respective historic activity, wherein the respective document is to be displayed on the display of the client terminal to the first client;

wherein a data exchange protocol between the first client and the second client has not been established in the instant messaging server system.

16. The method of claim 15, wherein the client terminal is a phone, a smart phone, a computer, a tablet, a pad, a PDA, a mobile device, or any combination thereof.

17. The method of claim 15, wherein the historic activity comprises at least one historic message.

18. The method of claim 15, wherein the instant messaging server system controls how the output of the requested historic activity is displayed.

19. The method of claim 15, wherein the Public Number is synchronized between the instant messaging server system and the client terminal.

* * * * *